(12) United States Patent
Gorokhov et al.

(10) Patent No.: US 8,432,821 B2
(45) Date of Patent: Apr. 30, 2013

(54) METHOD AND APPARATUS FOR COOPERATION STRATEGY SELECTION IN A WIRELESS COMMUNICATION SYSTEM

(75) Inventors: Alexei Y. Gorokhov, San Diego, CA (US); Siddhartha Mallik, San Diego, CA (US); Alan Barbieri, San Diego, CA (US); Jilei Hou, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 782 days.

(21) Appl. No.: 12/568,269

(22) Filed: Sep. 28, 2009

(65) Prior Publication Data

US 2010/0085917 A1 Apr. 8, 2010

Related U.S. Application Data

(60) Provisional application No. 61/102,282, filed on Oct. 2, 2008.

(51) Int. Cl.
*G06F 11/00* (2006.01)
*H04J 1/16* (2006.01)
*H04L 1/00* (2006.01)
*H04L 12/26* (2006.01)

(52) U.S. Cl.
USPC ............................ 370/252; 370/253; 370/254

(58) Field of Classification Search .................. 370/252, 370/254, 310, 328, 253; 375/260
See application file for complete search history.

(56) References Cited

U.S. PATENT DOCUMENTS

| 7,508,748 B2* | 3/2009 | Kadous | 370/208 |
| 7,801,238 B2* | 9/2010 | Borst et al. | 375/267 |
| 2005/0088959 A1* | 4/2005 | Kadous | 370/208 |
| 2005/0201446 A1* | 9/2005 | Bar-Ness et al. | 375/130 |
| 2007/0230405 A1* | 10/2007 | Yin et al. | 370/335 |
| 2009/0067557 A1* | 3/2009 | Zhengang et al. | 375/346 |
| 2009/0291699 A1* | 11/2009 | Heath et al. | 455/501 |

FOREIGN PATENT DOCUMENTS

| TW | I290000 B | 11/2007 |
| TW | I291169 B | 12/2007 |
| TW | I291316 B | 12/2007 |
| TW | I291816 B | 12/2007 |

OTHER PUBLICATIONS

Ericsson: "LTE-Advanced—Coordinated Multipoint transmission/ reception." 3GPP Draft TSG-RAN WG1 #53bis; R1-082469; Warsaw, Poland; (Jun. 30, 2008), XP050110740.

(Continued)

*Primary Examiner* — Chuong T Ho
(74) *Attorney, Agent, or Firm* — Florin Corie

(57) ABSTRACT

Systems and methodologies are described that facilitate cooperation strategy selection for a network multiple-in-multiple-out (N-MIMO) communication system. As described herein, one or more nodes in a communication system capable of N-MIMO communication can calculate marginal utilities, projected per-user rates, and/or other parameters corresponding to respective associated users. Based on these calculations, respective network nodes can perform user scheduling and selection, cell scheduling and selection, selection of a cooperation strategy (e.g., coordinated silencing, joint transmission, coordinated beamforming, etc.), and/or other operations to provide cooperative communication for respective users. As further described herein, projected rate calculation for a given user can be adjusted based on processing or channel implementation loss associated with the user, interference nulling capability of the user, or other factors. As additionally described herein, these and/or other parameters can be fed back by respective users to a serving network node and/or mandated via system performance requirements.

40 Claims, 16 Drawing Sheets

OTHER PUBLICATIONS

International Search Report and Written Opinion, PCT/US2009/059439, International Search Authority—European Patent Office—Sep. 23, 2010.

LG Electronics: "Multi-layered Rate Control for Network MIMO in LTE-Advanced." 3GPP Draft TSG RAN WG1 Meeting #54bis; R1-083656, Prague, Czech Republic, (Sep. 29, 2008).

Texas Instruments: "Network MIMO Precoding" 3rd Generation Partnership Project (3GPP) TSG RAN WG1 #53bis; No. R1-082497, Jul. 4, 2008, pp. 1-4, XP002559609.

Venkatesan, S. et al.: "Network MIMO: Overcoming Intercell Interference in Indoor Wireless Systems," IEEE, Nov. 2007, pp. 83-87.

Taiwan Search Report—TW098133611—TIPO—Jan. 2, 2013.

* cited by examiner

METHOD AND APPARATUS FOR COOPERATION STRATEGY SELECTION IN A WIRELESS COMMUNICATION SYSTEM

CROSS-REFERENCE

This application claims the benefit of U.S. Provisional Application Ser. No. 61/102,282, filed Oct. 2, 2008, and entitled "COOPERATION STRATEGY SELECTION IN NETWORK MIMO SYSTEMS," the entirety of which is incorporated herein by reference.

BACKGROUND

I. Field

The present disclosure relates generally to wireless communications, and more specifically to techniques for managing cooperative use of respective entities in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices. In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells.

Further, in a multiple-in-multiple-out (MIMO) communication system, multiple sources and/or destinations (e.g., corresponding to respective antennas) can be utilized for the transmission and reception of data, control signaling, and/or other information between devices in the communication system. The use of multiple sources and/or destinations for respective transmissions in connection with a MIMO communication system has been shown to yield higher data rates, improved signal quality, and other such benefits over single-input and/or single-output communication systems in some cases. One example of a MIMO communication system is a Network MIMO (N-MIMO) or Coordinated Multipoint (CoMP) system, in which a plurality of cells can cooperate to exchange information with one or more receiving devices, such as user equipment units (UEs) or the like. In such a wireless network implementation, it would be desirable to implement various improved techniques for selecting cooperation strategies and/or projected data rates for respective network users in order to enhance performance gains realized for the respective users via CoMP communication.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a set of network users; obtaining information relating to signal qualities identified by respective network users and interference levels observed by the respective network users; and computing per-user projected rates for network multiple-in-multiple-out (N-MIMO) communication with the respective network users based at least in part on obtained information relating to the signal qualities and interference levels of the respective network users.

A second aspect described herein relates to a wireless communications apparatus, which can comprise a memory that stores data relating to a set of user equipment units (UEs). The wireless communications apparatus can further comprise a processor configured to identify information relating to signal qualities and interference levels associated with respective UEs and to compute per-UE projected rates for Coordinated Multipoint (CoMP) communication with the respective UEs based at least in part on identified information relating to the respective UEs.

A third aspect relates to an apparatus, which can comprise means for obtaining channel state information from one or more terminals; means for estimating carrier and interference levels associated with the one or more terminals based on the channel state information; and means for calculating projected rates for the one or more terminals as a function of estimated carrier and interference levels associated with the one or more terminals.

A fourth aspect relates to a computer program product, which can comprise a computer-readable medium that comprises code for causing a computer to obtain channel state information from one or more UEs; code for causing a computer to estimate carrier and interference levels associated with the one or more UEs based on the channel state information; and code for causing a computer to calculate projected rates for the one or more UEs as a function of estimated carrier and interference levels associated with the one or more UEs.

A fifth aspect described herein relates to a method operable in a wireless communication system. The method can comprise identifying an amount of processing loss incurred in communication with at least one associated base station and reporting the amount of processing loss as feedback to the at least one associated base station.

A sixth aspect described herein relates to a wireless communications apparatus that can comprise a memory that stores data relating to at least one serving network node. The wireless communications apparatus can further comprise a processor configured to determine a processing loss associated with communication to the at least one serving network node and to report the processing loss as feedback to the at least one serving network node.

A seventh aspect relates to an apparatus operable in a wireless communication system. The apparatus can comprise means for identifying feedback information relating to device implementation loss associated with the apparatus and means for submitting the feedback information to one or more serving base stations.

An eighth aspect described herein relates to a computer program product, which can include a computer-readable medium that comprises code for causing a computer to identify at least one serving network node; code for causing a computer to determine a processing loss associated with communication to the at least one serving network node; and code for causing a computer to report the processing loss as feedback to the at least one serving network node.

A ninth aspect described herein relates to a method operable in a wireless communication system. The method can comprise identifying information relating to an extent of interference nulling capability of an associated receiver and reporting identified information relating to the extent of interference nulling capability of the associated receiver to at least one serving network node.

A tenth aspect described herein relates to a wireless communications apparatus, which can comprise a memory that stores data relating to at least one serving network node. The wireless communications apparatus can further comprise a processor configured to generate an indicator of interference nulling capability of a receiver associated with the wireless communications apparatus and to report the indicator as feedback to the at least one serving network node.

An eleventh aspect relates to an apparatus, which can comprise means for identifying feedback information relating to receiver nulling capability of the apparatus and means for submitting the feedback information to one or more serving base stations.

A twelfth aspect relates to a computer program product, which can comprise a computer-readable medium that comprises code for causing a computer to identify at least one serving network node; code for causing a computer to generate an indicator of interference nulling capability of a receiver associated with the apparatus; and code for causing a computer to report the indicator as feedback to the at least one serving network node.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
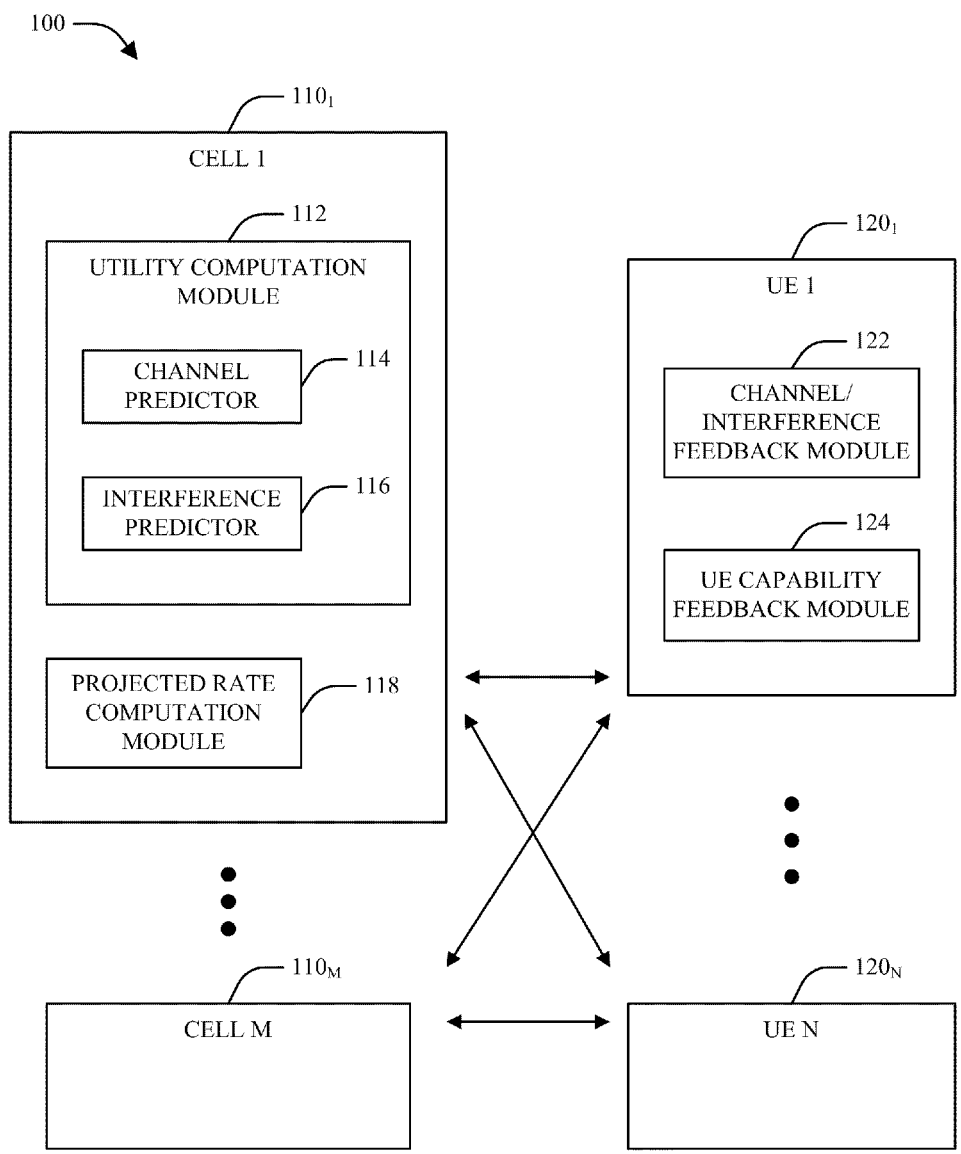
FIG. 1 is a block diagram of a system for performing marginal utility and projected rate computation within a cooperative wireless communication environment in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for performing marginal utility and projected rate computation within a cooperative wireless communication environment in accordance with various aspects. As FIG. 1 illustrates, system 100 can include one or more network cells (e.g., Node Bs, Evolved Node Bs (eNBs), base stations, access points, etc.) 110, which can communicate with respective user equipment units (UEs, also referred to as mobile stations, terminals, user devices, etc.) 120. In one example, respective cells 110 can correspond to and/or provide communication coverage for any suitable coverage area, such as an area associated with a macro cell, a femto cell (e.g., an access point base station or Home Node B (HNB)), and/or any other suitable type of coverage area.

In accordance with one aspect, a given UE 120 can communicate with any suitable number of network cells 110. For example, a UE 120 can conduct one or more uplink (UL, also referred to as reverse link (RL)) communications to a cell 110, and respective cells 110 can conduct one or more downlink (DL, also referred to as forward link (FL)) communications to the UE 120. In one example, system 100 can utilize one or more network multiple-in-multiple-out (Network MIMO or N-MIMO), cooperative multipoint (CoMP), and/or other techniques, by which a single UE 120 is enabled to communicate with a plurality of disparate cells 110 and/or sectors thereof. Additionally or alternatively, communication between a cell 110 and a UE 120 can result in a strong dominant interference to other nearby cells 110 and/or UEs 120. For example, if a UE 120 is located at the edge of an area corresponding to a cell 110 serving the UE 120, communication between the UE 120 and its serving cell can cause interference to one or more other cells 110 within range of the UE 120 with which the UE 120 is not communicating under various circumstances. This can occur, for example, in a system that includes femto cells if a UE 120 is located within the coverage area of a femto cell, which in turn is embedded into the coverage area of a macro cell.

In accordance with another aspect, respective cells 110 in system 100 can coordinate pursuant to one or more cooperation strategies in order to increase data rates associated with communication with a given UE 120 and/or to reduce interference caused to other cells 110 and/or UEs 120 in system 100. In one example, respective cells 110 in system 100 can be operable to utilize a plurality of cooperation techniques for transmission to one or more UEs 120, such as coordinated silencing (CS), joint transmission (JT) via inter-eNodeB (inter-cell) packet sharing, coordinated beamforming (CBF), and/or any other suitable cell cooperation technique(s) as generally known in the art. In another example, various operational aspects of system 100 such as respective cell cooperation techniques to be utilized for communication, cells 110 to be utilized for such cooperation techniques, and respective UEs 120 to be served via cooperative communication, can be based at least in part on marginal utility calculations performed by one or more cells 110 (e.g., via a utility computation module 112) and/or any other suitable metric.

In one example, utility associated with a given UE 120 can be defined in terms of channel quality, user priority level, or the like. In accordance with one aspect, utility computation module 112 can compute one or more channel quality metrics for a given UE 120 by estimating and/or otherwise assessing a channel component and an interference component of respective signals observed by the UE 120. Utility computation module 112 can utilize, for example, a channel predictor 114, an interference predictor 116, and/or any other suitable component(s) in accordance with various aspects herein to obtain channel and/or interference estimates for a given UE 120. In one example, information relating to channel quality and/or interference levels observed by a UE 120 can be reported from the UE 120 to a computing cell 110 via a channel/interference feedback module 122 and/or any other suitable means.

In accordance with a further aspect, a cell 110 in system 100 can utilize a projected rate computation module 118, which can be utilized in addition to and/or in lieu of utility computation module 112 to calculate per-user projected rates for respective associated UEs 120. In one example, a projected rate associated with a given UE 120 can correspond to an anticipated channel quality (e.g., given in terms of a Channel Quality Indicator or CQI) for the UE 120 based on various forms of cooperative transmission to the UE 120 (e.g., transmission by the computing cell alone, cooperative transmission by the computing cell and one or more other cells, etc.). Additionally or alternatively, a projected rate as computed by projected rate computation module 118 for a given UE 120 can correspond to an estimated data rate for the UE 120 based on a combination of conventional data rate projection techniques and signal/interference component estimates obtained via channel predictor 114 and/or interference predictor 116. Specific examples of techniques that can be utilized to compute projected rates for respective UEs 120 are provided in further detail herein.

In one example, projected rate computation module 118 can leverage a general form for computing projected per-UE rates based on various factors. These factors can include, for example, propagation channels for respective links involved in a utilized cooperation strategy (e.g., taking into account power and bandwidth resources allocated per link); channel prediction accuracy based on projected downlink estimation error at respective UEs 120 and corresponding feedback delay; anticipated interference levels from cooperative and non-cooperative network nodes (e.g., cells 110 and/or UEs 120), taking into account spatial interference structures as applicable; and/or any other suitable factors. In one example, respective UEs 120 in system 100 can provide information relating to downlink estimation errors, feedback delay, UE processing loss, interference nulling capability, and/or other information relating to the operational capabilities of the respective UEs 120 to respective cells 110 via a UE capability feedback module 124 and/or any other suitable means. Various examples of information relating to UE capabilities that can be reported by UEs 120 in system 100, as well as techniques by which such information can be processed by respective cells 110 in system 100, are described in further detail herein.

In accordance with one aspect, respective cells 110 in system 100 can perform marginal utility and/or projected rate computations for a given UE 120 based on various requirements for channel state information at the transmitter (CSIT). CSIT requirements can vary, for example, based on a cooperation strategy employed by respective cells 110 with respect to a given UE 120. By way of specific example, it can be appreciated that CSIT requirements associated with iterative signal processing and/or CBF can differ substantially between CSIT requirements for CS. In one example, a cell 110 can utilize an assumption of accurate CSIT at moderate to high post-processing carrier to interference (C/I) levels in order to employ first order approximation of an associated CSIT effect. Additionally or alternatively, in the event that a substantially high error effect (e.g., due to spatial error) is encountered, CS can be favored by cell 110 over more complex signal processing techniques. In accordance with one aspect, a threshold at which CS is selected over such techniques can be based on an empirical measure of channel prediction, as described in further detail herein.

Figure 2:
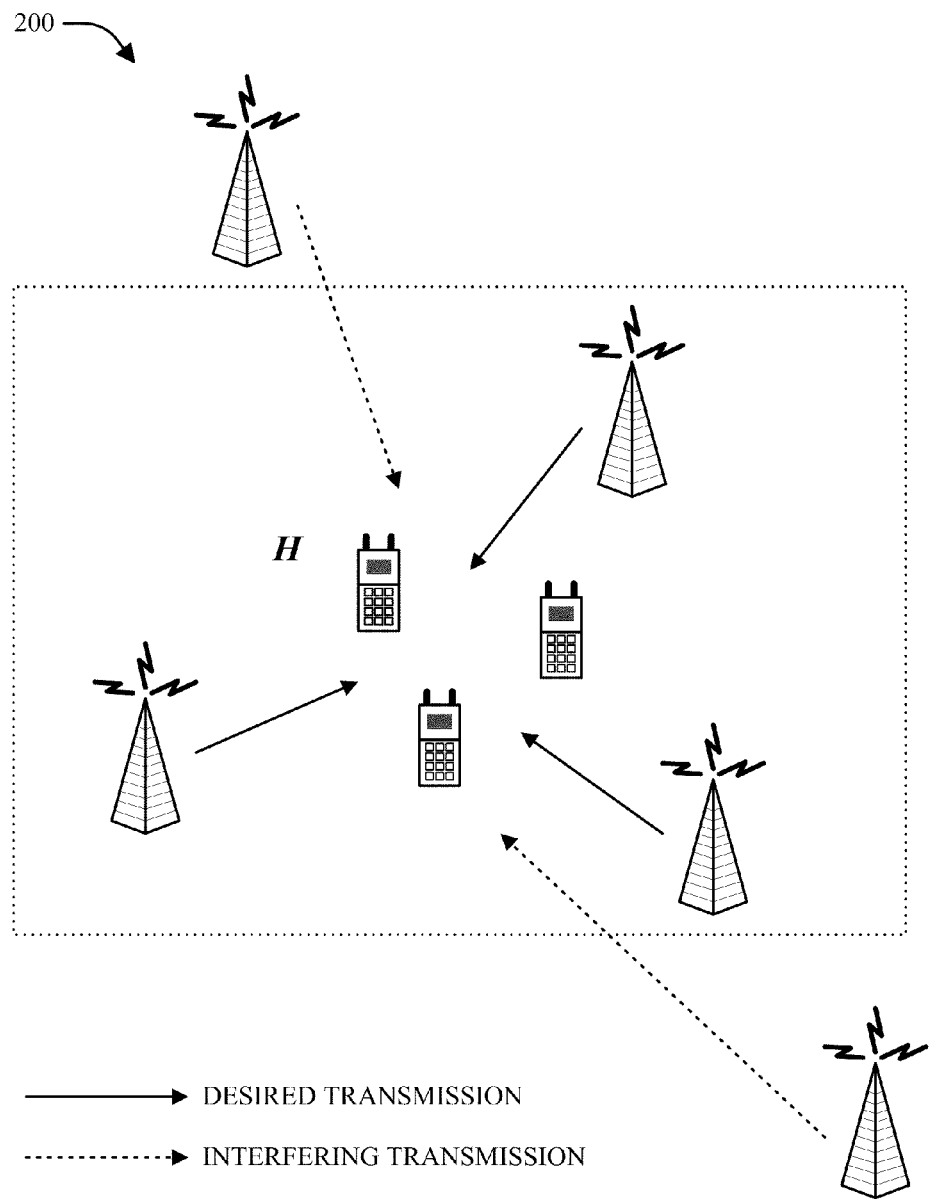
FIG. 2 illustrates an example cooperative communication deployment that can implement various aspects described herein.

In accordance with another aspect, projected rate calculation as performed by projected rate computation module 118 can proceed based on a channel structure as shown in diagram 200 in FIG. 2. As diagram 200 illustrates, various cooperative network nodes (e.g., located within a predetermined geographic area) can be utilized to conduct N-MIMO transmission to a set of users, while various non-cooperative nodes (e.g., located outside the predetermined geographic area) can cause interference to the cooperative network nodes and/or their served users in some cases.

In one example, based on the structure shown in diagram 200, the following example definitions and derivations can be made by projected rate computation module 118 to facilitate projected rate calculation for a given user. The following examples assume frequency flat fading and single-user pre-coded MIMO communication wherein streams are treated as separate UEs; however, it should be appreciated that the definitions and derivations described herein could be extended to any suitable network model. For example, an extension to selective fading could be facilitated by ignoring error correlation across resources.

First, a matrix H can be defined as a $M_{RX} \times M_{TX}$ channel matrix across all transmitter and receiver antennas (e.g., corresponding to network nodes and UEs, respectively) within a strategy S, wherein $M_{RX}$ and $M_{TX}$ correspond to the number of receiver antennas and the number of transmitter antennas, respectively. In one example, multiple transmitter (or receiver) antennas per node (or UE) can be allowed. Further, a $M_{TX} \times M_{UE}$ transmit beamforming matrix W and a $M_{RX} \times M_{UE}$ receive beamforming matrix Z can be defined, wherein $M_{UE}$ represents the number of UEs for which rates are computed. In addition, $I_u$ can be defined as receiver interference covariance contributed to a u-th UE by non-cooperative nodes. In one example, the above definitions can be leveraged to define a projected rate for a u-th UE at time t as $$R_{u,t}(S) = I\left(\frac{1}{\Gamma_u} \frac{C_u}{I_u}\right),$$

wherein I( ) represents an information rate, $\Gamma_u$ represents implementation loss for a u-th UE, and $C_u$ and $I_u$ respectively represent channel and interference components associated with a UE, which can be defined as $C_u = |Z_u HW_u|^2$ and $$I_u = Z_u I_u Z_u^* + \sum_{u' \neq u} |Z_u HW_{u'}|^2,$$

wherein $Z_u$ represents the row of Z associated with UE u and $W_u$ represents the column of W associated with UE u.

Subsequently, if projected rate computation module 118 operates under an assumption that the channel estimate as provided above is a minimum mean square error (MMSE) estimate, projected rate computation module 118 can utilize the MMSE approximation to account for channel estimation error together with scheduling delay. This can be done by, for example, including mismatch introduced by simplifications and/or imperfect tuning, as defined as follows:

$$\hat{H} = H + \Delta \hat{H};$$

$$\left[\Delta \hat{H}_{:,1}^T, \ldots, \Delta \hat{H}_{:,M_{TX}}^T\right]^T = CN\left(0, \begin{bmatrix} \Sigma_{1,1} & 0 & 0 \\ 0 & \ddots & 0 \\ 0 & 0 & \Sigma_{M_{TX},M_{TX}} \end{bmatrix}\right);$$

$$E\left\{\hat{H}_{:,l} \Delta \hat{H}_{:,l'}^*\right\} = 0 \quad \forall \, 1 \leq l, l' \leq M_{TX}.$$

Subsequently, projected rate computation module 118 can approximate a projected rate based on expected information rate conditioned on CSIT as follows:

$$\hat{R}_{u,t}(S) = E\{R_{u,t}(S) \mid \hat{H}\};$$

$$\hat{R}_{u,t}(S) \approx I\left(\frac{1}{\Gamma_u}\frac{\hat{C}_u}{\hat{I}_u}\right) + \frac{1}{\Gamma_u}\frac{\hat{C}_u}{\hat{I}_u} I'\left(\frac{1}{\Gamma_u}\frac{\hat{C}_u}{\hat{I}_u}\right) \sum_{l=1}^{M_{TX}} \hat{a}_l \hat{Z}_u \Sigma_{l,l} \hat{Z}_u^*;$$

$$\hat{C}_u = \left|\hat{Z}_u \hat{H} \hat{W}_u\right|^2;$$

$$\hat{I}_u = \hat{Z}_u \hat{I}_u \hat{Z}_u^* + \sum_{u' \neq u} \left|\hat{Z}_u \hat{H} \hat{W}_{u'}\right|^2.$$

In the above derivations and definitions, $\hat{H}$, $\hat{W}$, and $\hat{Z}$ are empirical counterparts of H, W, and Z obtained by replacing H with $\hat{H}$, and $\hat{I}_u$ is an estimate of $I_u$.

As further shown in the above derivations, approximate conditional expected information rate calculation can be conducted by projected rate computation module 118 by utilizing weights $\hat{a}_l$ that are computed based on by-products of the C/I calculations described above. In addition, $\Sigma_{l,l}$ as used above corresponds to estimation error covariance matrices that depend on an exact form of the estimate, which can be utilized to allow for simple closed form approximations in some cases. In one example, the weights $\hat{a}_l$ can be computed using the following:

$$\hat{a}_l = \frac{1}{\hat{C}_u}\left(\left|\hat{W}_{l,u}\right|^2 - \frac{\hat{C}_u}{\hat{I}_u}\left\|\hat{W}_{l,u' \neq u}\right\|^2 - \frac{2}{\hat{I}_u}\sum_{u' \neq u} \text{Re}\left\{\hat{W}_{l,u}\hat{W}_{l,u'}^* \hat{X}_{u,u'}^*\right\}\right),$$

wherein $\hat{X} = \hat{Z}\hat{H}\hat{W}$. Further, in some cases the summation in the above equation can be neglected at high C/I levels where, e.g., $\hat{X}_{u,u' \neq u} \rightarrow 0$.

With further reference to system 100 in FIG. 1, projected rate computation module 118, with the aid of and/or independently of utility computation module 112, can facilitate calculation of a per-user projected rate based on various factors. By way of a first example, projected rate computation module 118 can utilize a unified projected rate calculation rule, which can be based on a first order expansion of the average information rate and/or any other suitable parameters. In accordance with one aspect, a projected rate computed by projected rate computation module 118 pursuant to a unified projected rate calculation rule can be configured to be a sufficiently accurate approximation for JT, CBF, and/or other suitable operations, while additionally being sufficiently accurate for CS and/or similar operations. In one example, channel estimation error of silenced nodes associated with a projected rate computed using a unified calculation rule can be substantially large; however, it can be appreciated that such error can be mitigated via low receive power seen from the silenced nodes at a corresponding UE 120. In another example, a unified calculation rule as described above can be modified for high mobility cases (e.g., with or without correlated antennas).

By way of a second example, projected rate computation module 118 can perform ambient interference assessment in the context of projected rate calculation. In one example, ambient interference associated with a UE 120 can be determined based on a number of cells 110 serving the UE 120. For example, in the event that more than one cell 110 serves a UE 120, ambient interference associated with the UE 120 can be determined by projected rate computation module 118 under an assumption of full power transmission from all non-cooperative nodes within range of the UE 120. Alternatively, loading indicators associated with respective cells 110 (e.g., provided as feedback from a UE 120 within range of the cells 110 and/or by the cells 110 themselves over a backhaul link) can be utilized by projected rate computation module 118 such that interference can be discounted from nodes indicated as unloaded. In another example, in the event that a single cell 110 serves a given UE 120, the UE 120 can report an ambient interference estimate back to projected rate computation module 118 via conventional (e.g., traffic) CQI feedback and/or by any other suitable means.

By way of a third example, projected rate computation module 118 can leverage various CSIT estimation considerations in determining a per-user projected rate. For example, projected rate computation module 118 can track long-term statistics of respective channels in time, frequency, space, or the like. By doing so, it can be appreciated that projected rate computation module 118 can improve channel estimation and extrapolation accuracy for flat channels in time, frequency, space, or the like. Further, it can be appreciated that such tracking can enable projected rate computation module 118 to exploit spatial correlation of co-located antennas to, for example, facilitate beamforming gains for high mobility and/or low C/I UEs. In another example, projected rate computation module 118 can utilize a simple model fitting (e.g., a one-tap separable infinite impulse response (IIR) model or the like) to approximate correlations in time, frequency, space, and so on.

Figure 3:
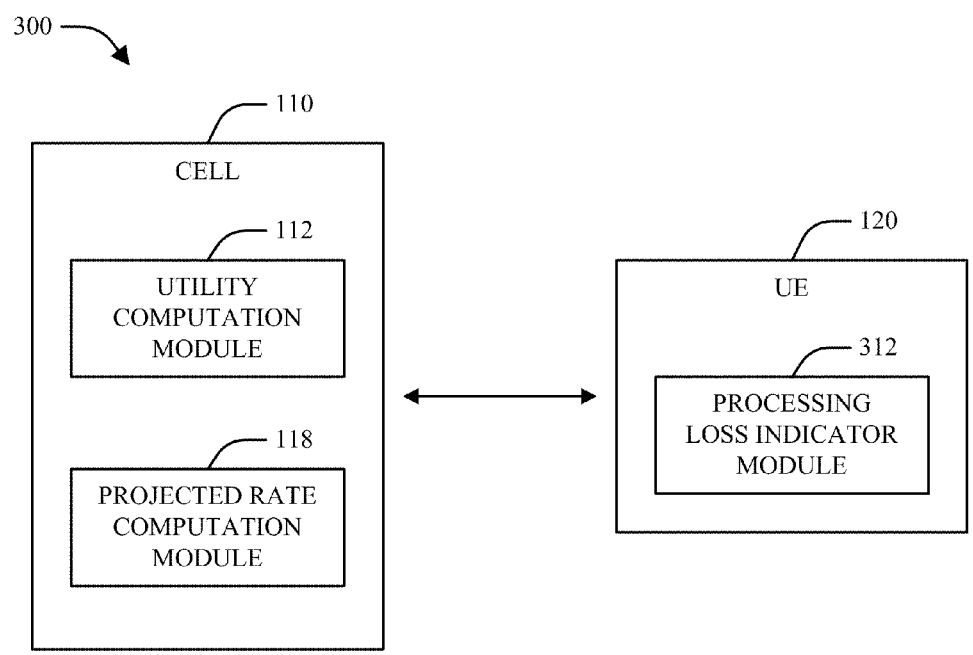
FIG. 3 is a block diagram of a system for estimating a per-user projected rate based on user processing loss in accordance with various aspects.

In accordance with one aspect, projected rate computation module 118 can further take processing or implementation loss of a given UE 120 (e.g., a parameter $\Gamma_u$ corresponding to a u-th UE as provided in the above derivations) into account in determining a projected rate for the UE 120. This is illustrated in further detail by diagram 300 in FIG. 3. In conventional systems involving a single cell communicating with a single UE, CQI information is generally reported from the UE to the cell as a maximum supportable data rate as opposed to interference parameters for respective non-serving cells. However, it can be appreciated that such a generalized report does not provide information regarding processing loss incurred by the UE as a result of, for example, channel implementations utilized by the UE, soft decoding techniques leveraged by the UE, or other such causes. Instead, such processing or implementation loss is absorbed into the generalized CQI reports provided by the UE. Further, it can be appreciated that processing loss associated with a given UE does not scale for N-MIMO communication (e.g., for an increasing number of serving cells), as strategy selection is generally performed by the network.

In the context of N-MIMO or CoMP communication, one or more cells 110 associated with a given UE 120 can facilitate selection of respective cells 110 to be involved in a given communication with the UE 120, and as a result channel information and interference can be observed at the UE 120 from a plurality of different cells 110. Subsequently, in a manner similar to that described above with respect to system 100, carrier and interference estimates corresponding to various cells 110 and corresponding UEs 120 can be obtained, which can be leveraged by projected rate computation module 118 to map respective UEs 120 to projected data rates. Accordingly, projected rate computation module 118 can utilize information relating to processing loss of various UEs 120 to aid in determining per-user data rates corresponding to respective UEs 120.

In accordance with one aspect, information relating to user processing or implementation loss can be made known to projected rate computation module 118 and/or utility computation module 112 in various manners. As a first example, processing loss can be defined as a UE-specific parameter, which can be provided as feedback from respective UEs 120 via an associated processing loss indicator module 312 and/or other suitable means. Thus, for example, UE 120 can be configured to provide long-form feedback to cell 110 that includes one or more bits relating to a processing loss associated with UE 120 (e.g., in dB and/or any other suitable unit(s)) via processing loss indicator module 312, such that the processing loss information can subsequently be utilized by cell 110 in making scheduling decisions. As a second example, a maximum processing loss can be defined within system 300 for respective UEs and/or groups of UEs (e.g., per UE category) via a minimum performance specification (MPS) for system 300 or the like. A maximum processing loss obtained in this manner can serve as a limit on processing loss reported by a given UE 120, or alternatively a maximum processing loss defined for a given UE 120 or UE category to which the UE 120 belongs can be utilized by projected rate computation module 118 as a default or assumed processing loss for the UE 120 in performing projected rate calculation.

Figure 4:
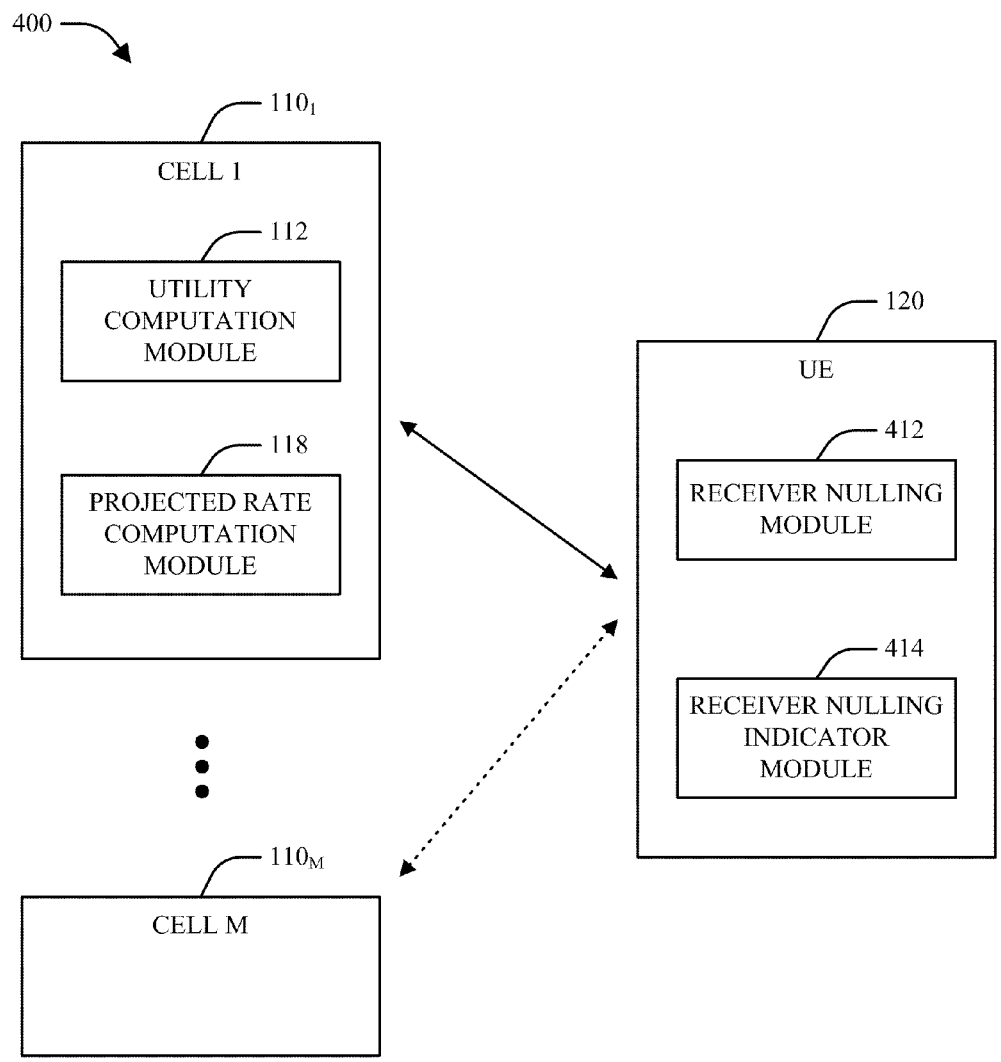
FIG. 4 is a block diagram of a system for estimating a per-user projected rate based on receiver nulling capability of respective users in accordance with various aspects.

In accordance with an additional aspect, respective UEs 120 in a wireless communication system can be configured to include receiver interference nulling capability and/or similar capability, which can be taken into account by projected rate computation module 118 in determining a projected rate for the respective UEs 120. This is illustrated in further detail by diagram 400 in FIG. 4.

As illustrated in system 400, a UE 120 can include a receiver nulling module 412 and/or other similar mechanisms, which can be utilized by UE 120 to filter and/or otherwise eliminate interference from one or more network nodes. By way of specific example, a UE 120 equipped with two or more receive antennas and corresponding receiver nulling capability via a receiver nulling module 412 can be located in a network environment that includes a serving macro cell and a non-serving femto cell (e.g., a restricted access cell that UE 120 does not have permission to access) that is sufficiently proximate to UE 120 to cause the femto cell to be a dominant interferer for UE 120. In such an example, in the event that no additional dominant interferers are present and channels associated with the serving macro cell and non-serving femto cell are substantially static, UE 120 can leverage receiver nulling module 412 in order to build a filter to null interference caused by the non-serving femto cell. As a result, it can be appreciated that receiver interference nulling capability of a UE 120 can substantially change post-processing C/I levels associated with the UE 120 due to the fact that the interference nulling in this manner enables high channel quality to be maintained with minimal cooperation between cells in a dominant interferer scenario. Thus, in accordance with one aspect, a projected rate computation module 118, a utility computation module 112, and/or other suitable components of a network cell 110 can account for receiver nulling gains in determining per-user projected rates, thereby substantially improving strategy selection performance.

In accordance with one aspect, information relating to receiver nulling capability of a UE 120 can be made known to respective cells 110 in system 400 in various manners. For example, UE capabilities can be defined in terms of receiver interference nulling, which can be provided to a given cell 110 via a receiver nulling indicator 414 and/or other suitable means of a UE 120, based on which a projected rate computation module 118 can account for the specific nulling capabilities of the UE 120 (e.g., in terms of a maximum amount of interference, number of interferers, etc., capable of being nulled) in determining a projected rate for UE 120. Defining and facilitating feedback of receiver nulling capability in this manner can, in one example, assume spatial receiver MMSE with a maximum processing loss enforced through performance tests or the like.

As an alternative example, minimum nulling requirements can be defined within system 400 for respective UEs and/or groups of UEs (e.g., per UE category) via network-wide requirements associated with respective UEs 120. By way of example, a UE 120 with n receive antennas that is capable of n-th order MIMO can be mandated to support receiver interference nulling. More particularly, RX nulling capability for a given UE 120 can be mandated via an MPS and/or other suitable specification based on UE category or the like. For instance, a UE 120 which is capable of supporting n-th order MIMO can be mandated to be capable of nulling (n−1) dominant interferers. More generally, respective UEs 120 can be mandated such that a UE 120 can be configured to simultaneously support m MIMO streams and null up to k dominant interferers, where (m+k)<n. This can be achieved by, for example, implementing minimum mean square error (MMSE) receiver techniques at a given UE 120.

A minimum nulling capability level obtained in this manner can serve as a floor on nulling capability reported by a given UE 120, or alternatively respective cells 110 can assume that respective UEs 120 comply with the mandated nulling requirements and base scheduling decisions on the mandated requirements.

Figure 5:
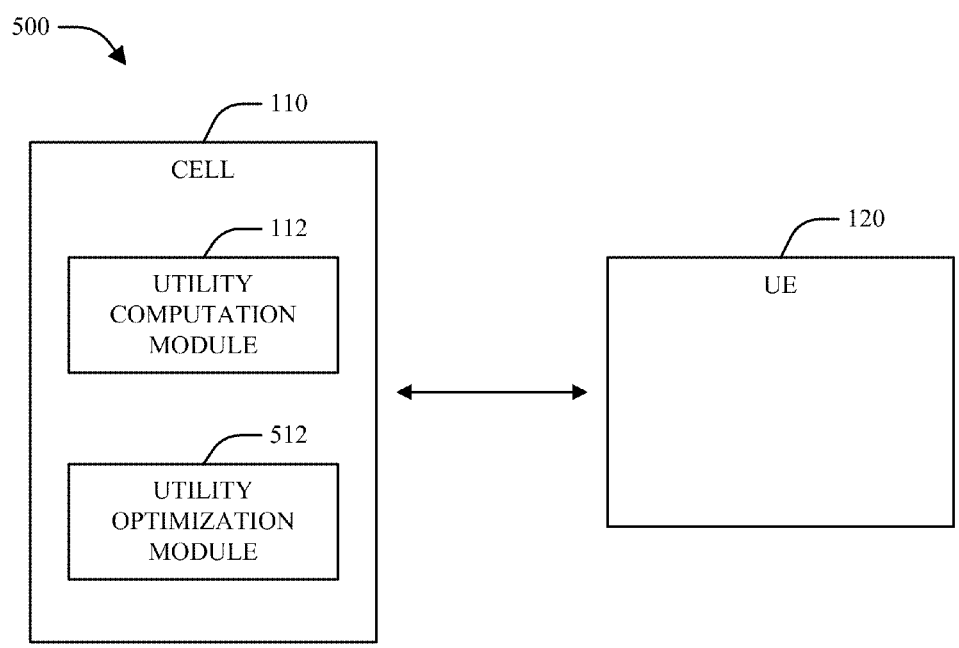
FIG. 5 is a block diagram of a system for optimizing per-user marginal utility computations in accordance with various aspects.

Referring next to FIG. 5, a block diagram of a system 500 for optimizing per-user marginal utility computations in accordance with various aspects is illustrated. As shown in FIG. 5, system 500 can include one or more cells 110, which can communicate with respective associated UEs 120 as generally described herein. In one example, cell 110 can include a utility computation module 112, which can facilitate calculation of marginal utility parameters associated with respective UEs 120 in connection with selection of a cooperation strategy to be utilized for one or more UEs 120. As system 500 further illustrates, a cell 110 can further include a utility optimization module 512, which can be utilized to optimize utility parameters calculated by utility computation module 112.

In accordance with one aspect, utility optimization module 512 can perform transmit processing optimization via strategy utility maximization. This can be achieved using, for example, one or more iterative utility maximization algorithms (e.g., algorithms similar to iterative pricing), wherein an iterative search is performed at respective network nodes (e.g., cells 110, sectors within cells 110, etc.) for respective candidate cooperation strategies. In one example, utility optimization module 512 can take into account various cooperation technique constraints, which can be, for example, reflected in constraints on the beam coefficients of various nodes. In another example, utility optimization module 512 can utilize first order extension to update respective beam weights at each iteration until convergence. In various implementations, convergence can be made dependent on an algorithm starting point.

The algorithm starting point can, in accordance with another aspect, be selected in a variety of manners. For example, a starting point can be selected via zero-forcing (ZF) across respective cooperating nodes, maximum ratio combining (MRC) and/or MMSE-based approaches, or the like. In one example, power allocation techniques can be applied in addition to ZF and/or MRC.

In accordance with another aspect, utility optimization module 512 can utilize iterative processing, which can be conducted as follows. It should be appreciated that iterative processing as performed based on the following discussion can utilize a substantial portion of the assumptions and notations utilized above with respect to projected rate calculation. Initially, utility of a marginal strategy can be expressed by utility optimization module 512 as a function of C/I values of respective UEs 120 served by the strategy (e.g., based on single-user precoded MIMO, wherein streams are treated as separate UEs 120), or $$U_t(S) = \sum_{u \in Y(S)} p_{u,t} R_{u,t}(S), \text{ where } R_{u,t}(S) = I\left(\frac{1}{\Gamma_u}\frac{C_u}{I_u}\right)$$

as noted above. Based on this expression, utility optimization module 512 can calculate derivatives of the strategy utility with respect to the C/I values of the involved UEs 120 as $$\frac{\partial U_t(S)}{\partial (C_u/I_u)}, u \in Y(S) = \frac{p_{u,t}}{\Gamma_u}I'\left(\frac{1}{\Gamma_u}\frac{C_u}{I_u}\right).$$

Accordingly, based on a notation that defines $U_t(S(W))$ as the utility associated with strategy S based on transmit beamforming matrix W, utility optimization module 512 can determine a proper selection of Z subject to H and W by solving for a variable $\Phi_u$ in the following:

$$U_t(S(W + \Delta W)) = U_t(S(W)) + \sum_{u \in Y(S)} \text{Re}\{W_u^* H^* \Phi_u \Delta W_u\} + O(\|\Delta W\|^2);$$

$$\Phi_u = \frac{2}{I_u}\frac{\partial U_t(S)}{\partial (C_u/I_u)}Z_u^* Z_u - \sum_{u' \neq u}\frac{2}{I_u}\frac{\partial U_t(S)}{\partial (C_{u'}/I_{u'})}\frac{C_{u'}}{I_{u'}}Z_{u'}^* Z_{u'}.$$

In accordance with a further aspect, upon obtaining a starting point for optimization for a value of W and a corresponding value of Z (e.g., based on ZF, MRC, MMSE, etc.), utility optimization module 512 can iterative conduct the following optimization procedure. First, utility optimization module 512 can calculate C/I levels for respective UEs 120 and update $\Phi_u$ accordingly based on the latest values of W and Z. Next, a tentative update of W can be defined according to the utility gradient as $W_u := W_u + \mu H^* \Phi_u H W_u$ for $u \in Y(S)$. Subsequently, utility optimization module 512 can modify W to reflect respective applicable constraints. For example, entries $W_{l,u}$ in W can be zeroed out if transmitter l is not serving UE u. In addition, W can be scaled to ensure that maximum power constraints of respective transmitters are not exceeded. Upon modifying W, Z can be updated based on the modifications to W. Finally, if the corresponding increase in $U_t(S(W))$ is less than a predefined threshold, or a maximum number of iterations is reached, optimization can complete; otherwise, the above steps can be repeated.

In accordance with an additional aspect, utility optimization module 512 can obtain a starting point for the above procedure based on zero-forcing with water filling. More particularly, utility optimization module 512 can start with a normalized zero-forcing scheme W having the same transmitter energy for substantially all UEs 120. Based on this scheme, water filling can be defined as follows:

$$\underline{W} = H^*(HH^*)^{-1}\text{diag}\{(HH^*)^{-1}\}^{-1/2};$$

$$W = \underline{W}\text{diag}\{\sqrt{P_u}\}_{u \in Y(S)}.$$

Next, utility optimization module 512 can select the total powers $P_u$ allocated per UE according to water filling in a way that maximizes $U_t(S(W))$. For example, it can be appreciated that generalized water filling over $\{P_u\}$ can apply to the sum-utility $$U_t(S) = \sum_{u \in Y(S)} p_{u,t} I\left(\frac{P_u}{\Gamma_u}\frac{\|Z_u H W_u\|^2}{Z_u I_u Z_u^*}\right).$$

Based on this formulation, I (...) can be approximated by the unconstrained capacity, and a constraint on the total transmit power can be given by $$\sum_{u \in Y(S)} P_u.$$

Subsequently, utility optimization module 512 can normalize an obtained solution to meet per-transmit antenna power constraints. While the above example is specific to ZF, it should be appreciated that similar techniques could be utilized for MRC, MMSE, and/or any other suitable technique(s).

Figure 6:
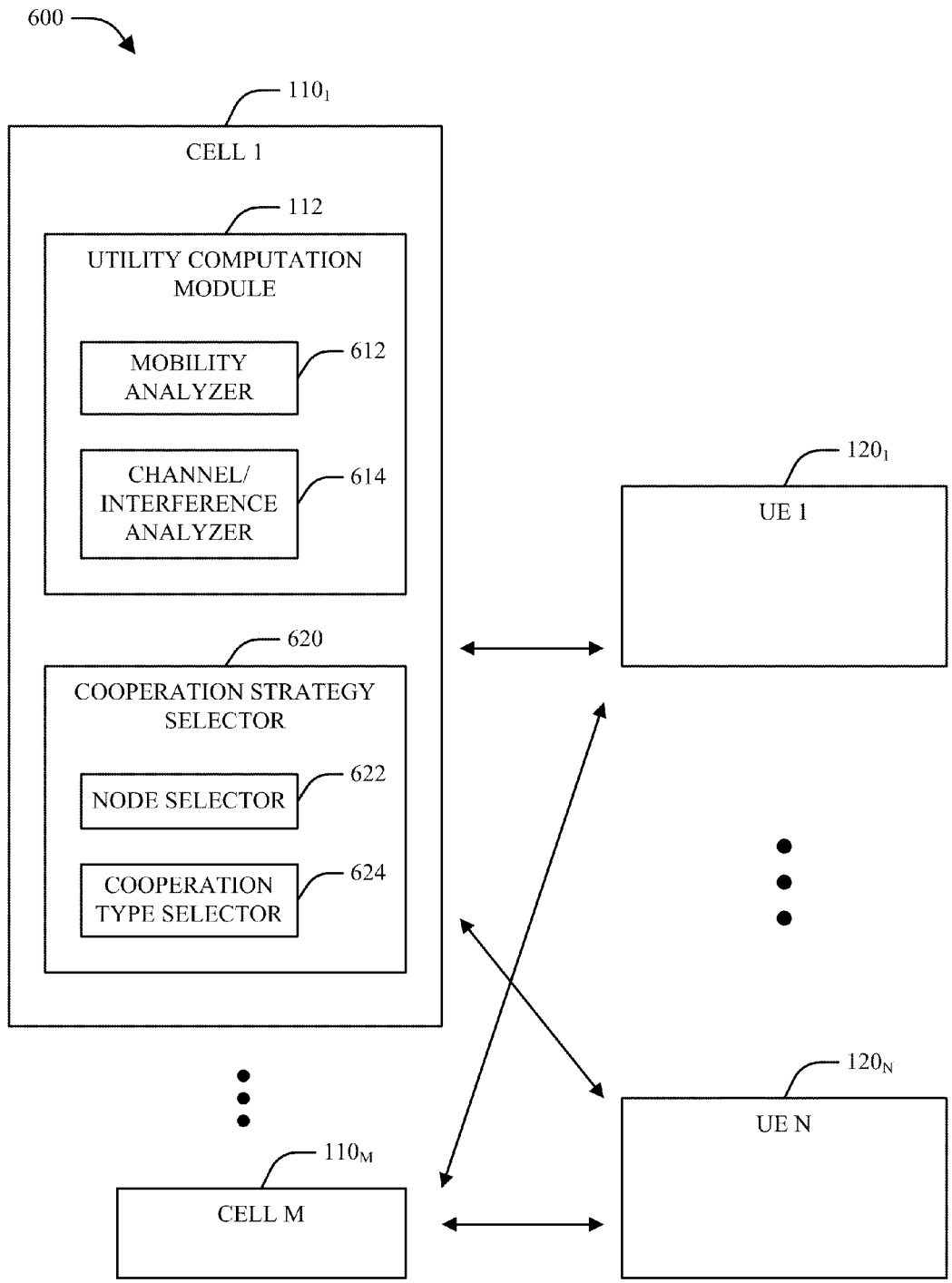
FIG. 6 is a block diagram of a system for selecting a cooperation strategy for communication between respective cell sites and respective terminal devices in a wireless communication system in accordance with various aspects.

Turning to FIG. 6, a block diagram of a system 600 for selecting a cooperation strategy for communication between respective cell sites (e.g., cells 110) and respective terminal devices (e.g., UEs 120) in a wireless communication system is illustrated. As shown in system 600, respective cells 110 can include a utility computation module 112 for determining marginal utility associated with respective users as generally described above, based on which a cooperation strategy selector 620 can coordinate respective transmissions between cells 110 and UEs 120 in system 600. In general, cooperation strategy selector 620 can be utilized by a cell 110 to compute and/or make scheduling decisions relating to node clustering, scheduling, forms of cooperative transmission to be utilized, and so on. To these ends, cooperation strategy selector 620 can include a node selector 622 for scheduling respective nodes to be utilized for communication with a given UE 120, a cooperation type selector 624 to determine a form of cooperation to utilize for communication with a given UE 120, and/or other suitable mechanisms.

In accordance with one aspect, a cooperation strategy can be selected by cooperation type selector 624 based on factors such as UE mobility (e.g., as determined by a mobility analyzer 612), C/I levels associated with respective UEs 120 (e.g., as identified by a channel/interference analyzer 614), capabilities of backhaul links between respective cells, or the like. By way of example, cooperation type selector 624 can select CS and/or another similar simple form of cell cooperation in the case of high-mobility UEs and/or rapidly changing channel conditions associated with a given UE 120. Additionally or alternatively, if mobility of a given UE 120 is determined to be low, or a high degree of antenna correlation is present with respect to the UE 120, more advanced cooperation techniques such as JT via inter-cell packet sharing (e.g., in the case of a relatively slow backhaul link between cells 110) or CBF (e.g., in the case of a relatively fast backhaul link between cells 110) can be selected.

In accordance with another aspect, a projected rate associated with respective UEs (e.g., as computed in accordance with various examples described above) can be utilized along with factors such as backhaul bandwidth, latency constraints, or the like, to select between respective cooperation techniques. For example, cooperation type selector 624 can rule out a JT technique using backhaul bandwidth and latency uncertainty based on associated a priori and/or long-term backhaul link classifications. In another example, CSIT delivery delay and accuracy, as well as scheduling delay and/or other suitable factors, can be factored in projected rate calculation.

By way of specific example, cooperation type selector 624 can utilize a set of cooperation technique selection rules as follows. First, cooperation type selector 624 can rule out a JT technique based on a long-term backhaul link classification. Further, cooperation type selector 624 can consider CBF techniques over JT in the event that a ratio of a combined energy C/I to the best node C/I is below a predefined threshold. In addition, if an associated channel prediction error is above a threshold value, cooperation type selector 624 can consider CS (e.g., in the event that CBF and/or JT are possible).

Referring now to FIGS. 7-11, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
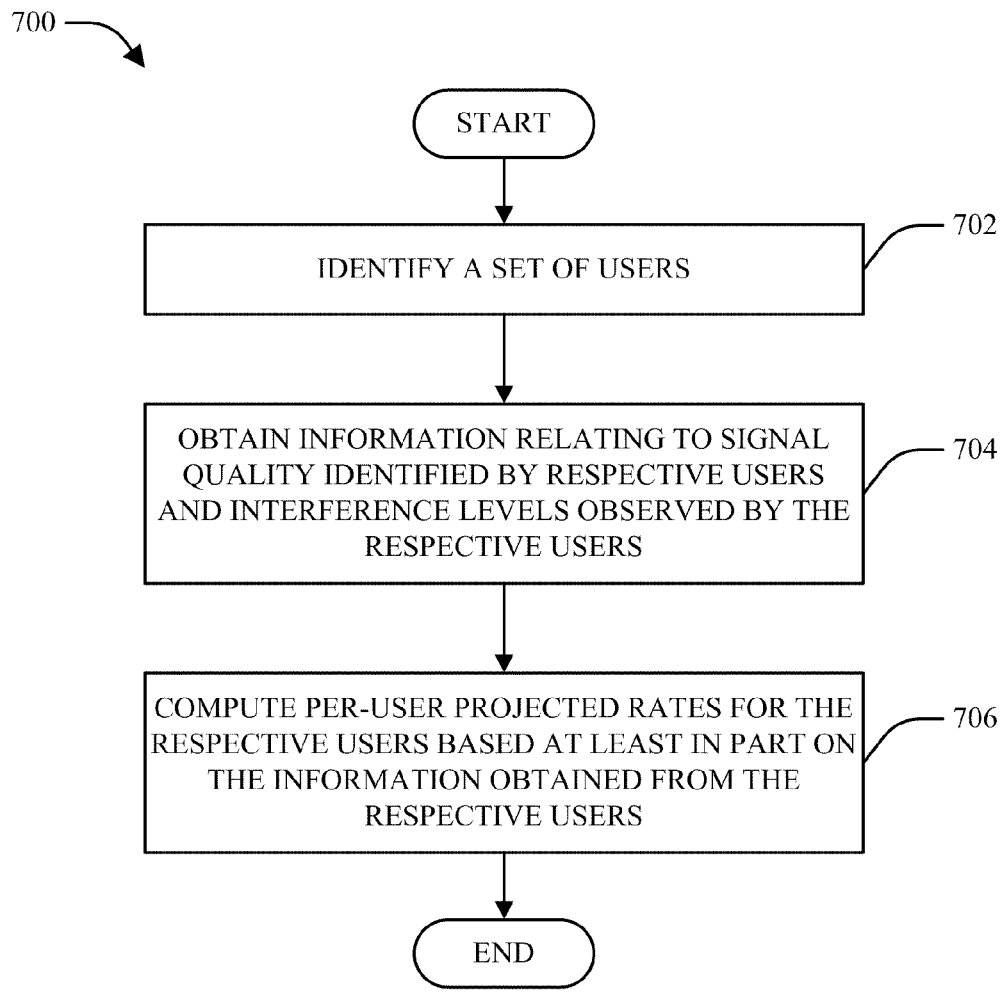
FIGS. 7-9 are flow diagrams of respective methodologies for calculating per-user projected rates associated with a cooperative network transmission scheme.

With reference to FIG. 7, illustrated is a methodology 700 for calculating per-user projected rates associated with a cooperative network transmission scheme. It is to be appreciated that methodology 700 can be performed by, for example, a network cell (e.g., cell 110 in system 100) and/or any other appropriate network device. Methodology 700 begins at block 702, wherein a set of users (e.g., UEs 120) are identified. Next, at block 704, information relating to signal quality identified by respective users identified at block 702 and interference levels observed by the respective users is obtained (e.g., by a channel predictor 114 and an interference predictor 116, respectively). Methodology 700 can then conclude at block 706, wherein per-user projected rates for the respective users identified at block 702 are computed (e.g., by a projected rate computation module 118) based at least in part on the information obtained at block 704.

Figure 8:
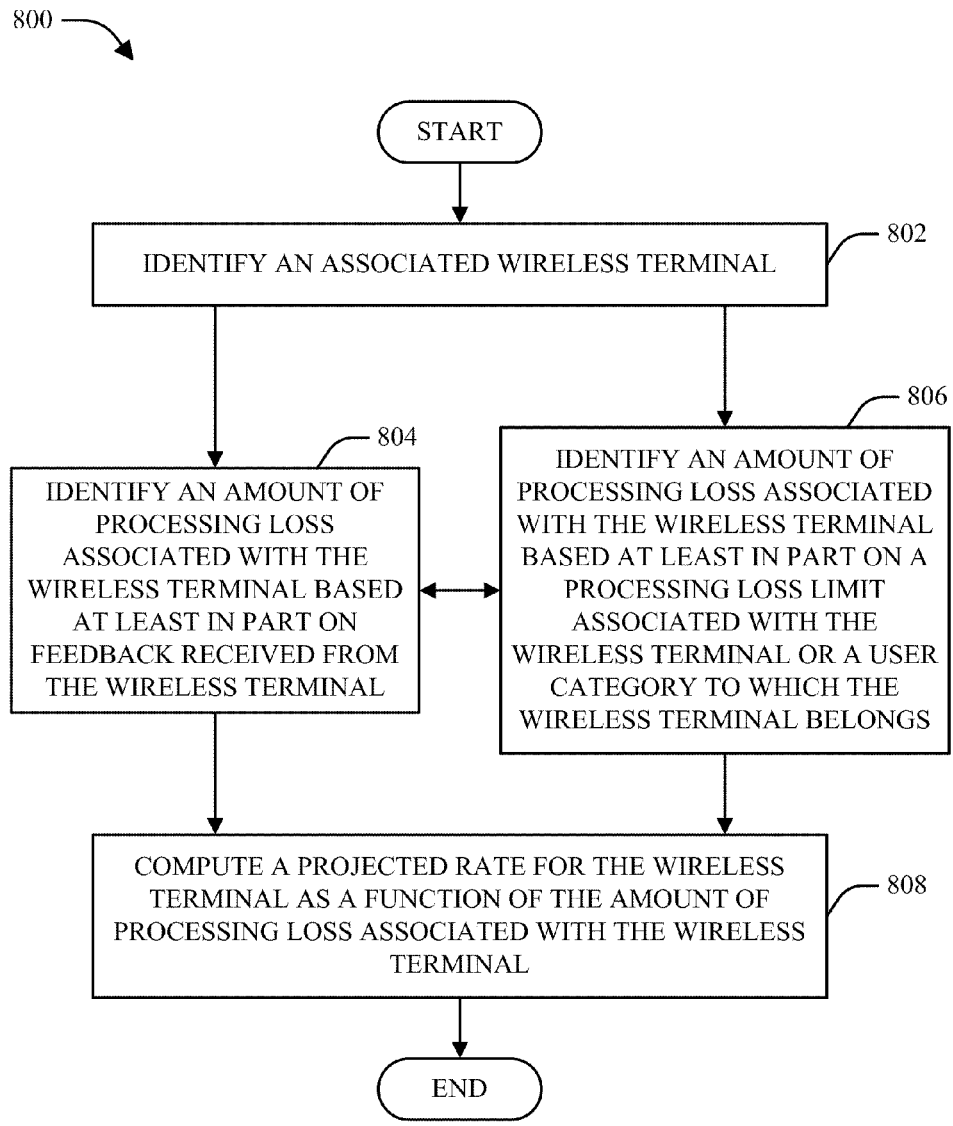

Turning next to FIG. 8, a flow diagram of a methodology 800 for calculating per-user projected rates based on user processing loss information is illustrated. Methodology 800 can be performed by, for example, a base station and/or any other appropriate network entity. Methodology 800 begins at block 802, wherein an associated wireless terminal is identified. Methodology 800 can then proceed to block 804 and/or block 806 from block 802. More particularly, at block 804, an amount of processing loss associated with the wireless terminal identified at block 802 is identified based at least in part on feedback received from the wireless terminal (e.g., via a processing loss indicator module 312). Additionally or alternatively, at block 806, an amount of processing loss associated with the wireless terminal identified at block 802 is identified based at least in part on a processing loss limit associated with the wireless terminal or a user category to which the wireless terminal belongs (e.g., a per-UE or per-UE category maximum processing loss mandated in an associated MPS and/or by any other suitable means).

In accordance with one aspect, methodology 800 can perform the acts described at block 804, the acts described at block 806, or a combination thereof. For example, a mandated processing loss limit associated with a given wireless terminal identified at block 806 can serve as a cap or a floor on a processing loss obtained from the wireless terminal at block 804. Additionally or alternatively, a mandated processing loss limit as given at block 806 can be utilized as a default processing loss in the event that no feedback relating to processing loss is received from the wireless terminal In one example, upon completing the acts described at block 804 and/or block 806, methodology 800 can conclude at block 808, wherein a projected rate for the wireless terminal is computed as a function of the amount of processing loss associated with the wireless terminal as identified at block 804 and/or block 806.

Figure 9:
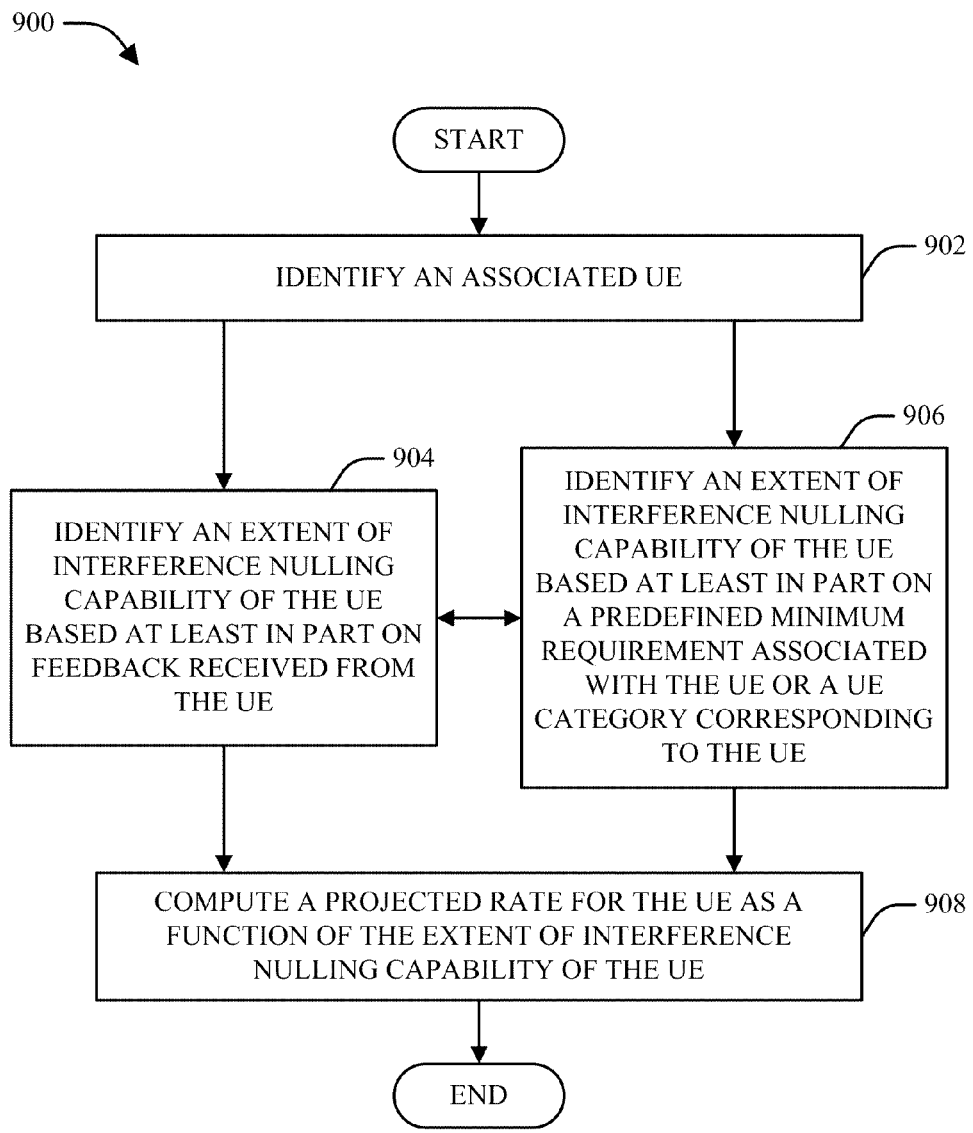

FIG. 9 illustrates a methodology 900 for calculating per-user projected rates based on receiver interference nulling indicators. Methodology 900 can be performed by, for example, a wireless network node and/or any other suitable network device. Methodology 900 begins at block 902, wherein an associated UE is identified. From block 902, methodology can proceed to block 904, wherein an extent of interference nulling capability of the UE identified at block 902 is identified based at least in part on feedback received from the UE (e.g., via a receiver nulling indicator module 414), and/or to block 906, wherein an extent of interference nulling capability of the UE is identified based at least in part on a predefined minimum requirement associated with the UE or a UE category corresponding to the UE (e.g., as mandated in an associated network specification and/or otherwise set throughout an associated communication network).

In accordance with one aspect, methodology 900 can perform the acts described at block 904, the acts described at block 906, or a combination thereof. For example, a mandated minimum nulling capability associated with a given UE as identified at block 906 can serve as a cap or a floor on interference nulling capability feedback received at block

904. Additionally or alternatively, receiver nulling requirements identified at block 906 can be utilized as a default parameter for the UE identified at block 902 in the event that no feedback relating to interference nulling is received from the UE. In one example, upon completing the acts described at block 904 and/or block 906, methodology 900 can conclude at block 908, wherein a projected rate for the UE identified at block 902 is computed as a function of the extent of interference nulling capability indicated by and/or otherwise associated with the UE at block 904 and/or block 906.

Figure 10:
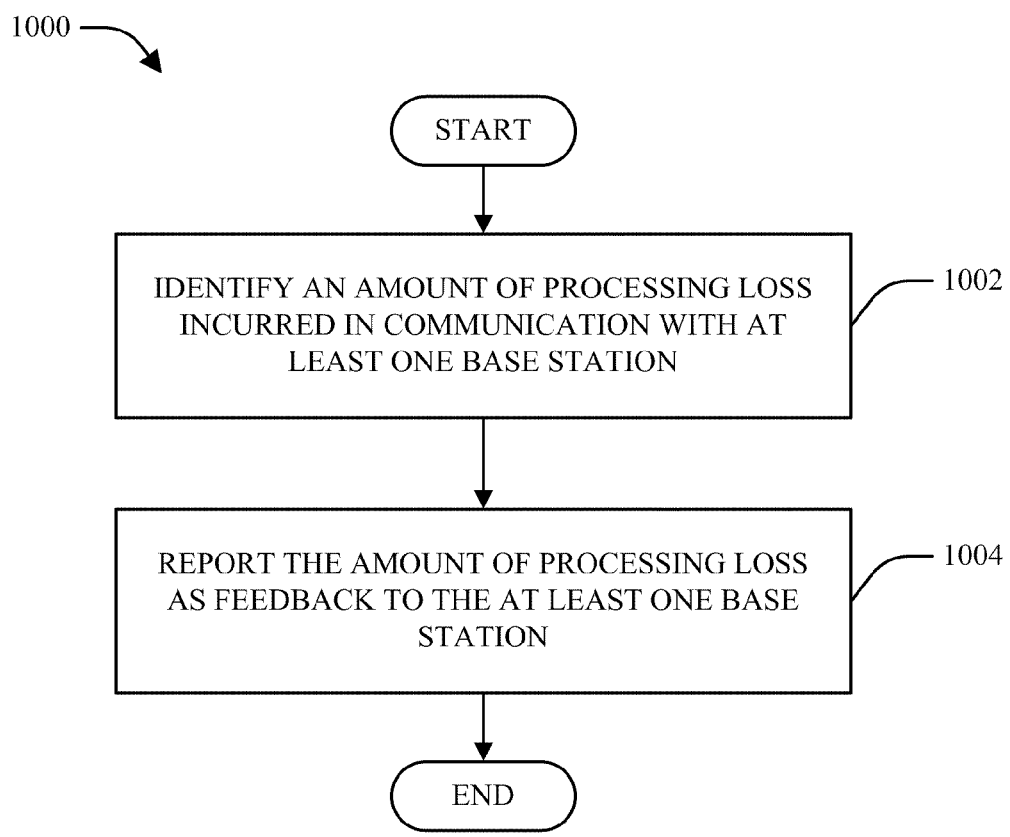
FIGS. 10-11 are flow diagrams of respective methodologies for identifying and communicating feedback relating to a cooperative network transmission deployment.

Referring next to FIG. 10, illustrated is a methodology 1000 for identifying and communicating feedback relating to a cooperative network transmission deployment. It is to be appreciated that methodology 1000 can be performed by, for example, a wireless terminal (e.g., UE 120) and/or any other appropriate network device. Methodology 1000 begins at block 1002, wherein an amount of processing loss incurred in communication with at least one base station (e.g., a cell 110) is identified. In one example, an amount of processing loss identified at block 1002 can be based at least in part on a mandated processing loss limit associated with an entity performing methodology 1000. Thus, for example, either an actual processing loss or a mandated processing loss can be identified at block 1002 under various circumstances. Upon completing the acts described at block 1002, methodology 1000 can conclude at block 1004, wherein the amount of processing loss identified at block 1002 is reported as feedback to the at least one base station (e.g., using a processing loss indicator module 312).

Figure 11:
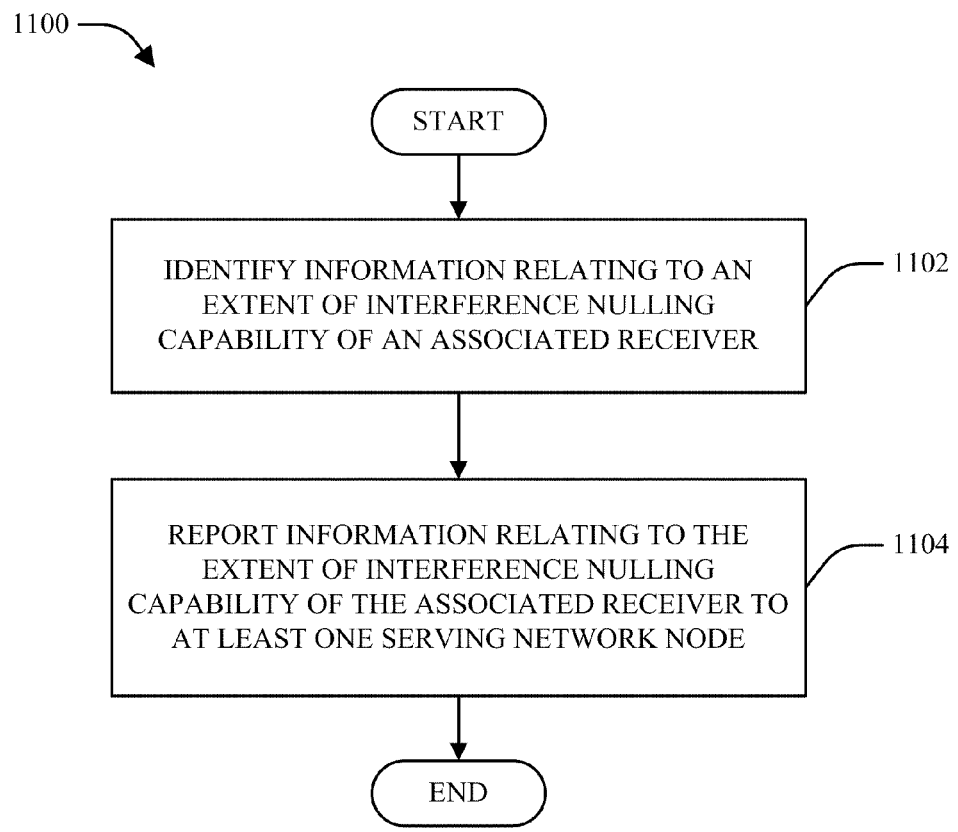

Turning to FIG. 11, a flow diagram of another methodology 1100 for identifying and communicating feedback relating to a cooperative network transmission deployment is illustrated. Methodology 1100 can be performed by, for example, a UE and/or any other suitable network device. Methodology 1100 begins at block 1102, wherein information relating to an extent of interference nulling capability of an associated receiver is identified. In one example, receiver nulling capability as identified at block 1102 can be based at least in part on a system-wide interference nulling specification associated with an entity performing methodology 1100. Thus, for example, information relating to either actual interference nulling capability or specified and/or mandated interference nulling capability can be identified at block 1102 under various circumstances. Upon completing the acts described at block 1102, methodology 1100 can conclude at block 1104, wherein the information identified at block 1102 is reported to at least one serving network node (e.g., using a receiver nulling indicator module 414).

Figure 12:
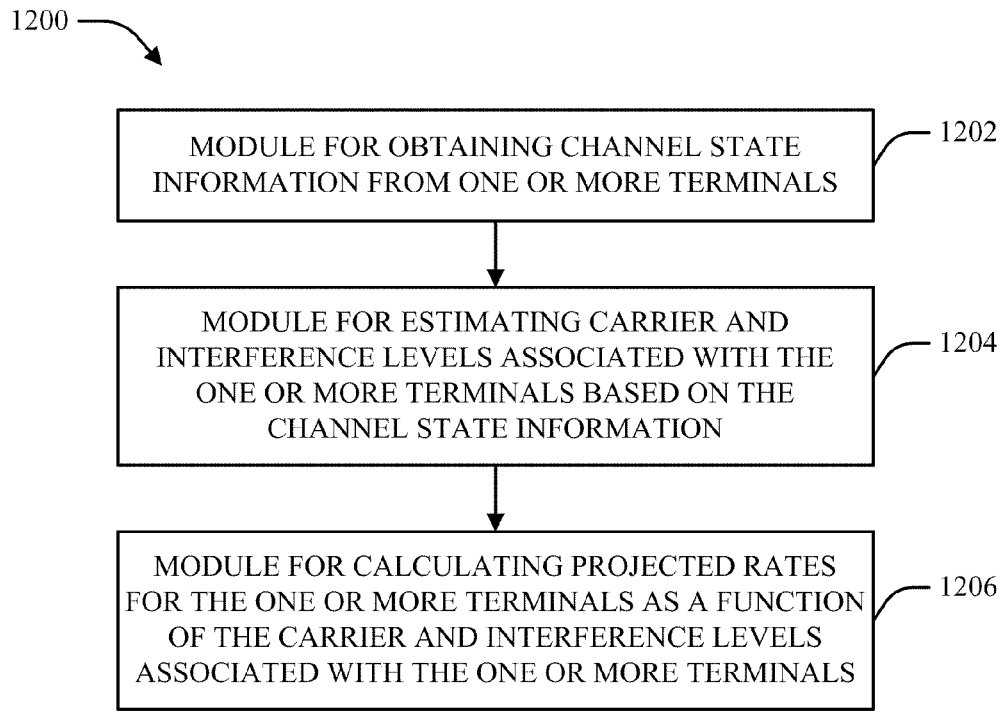
FIGS. 12-13 are block diagrams of respective apparatus that facilitate initialization and use of respective cooperation strategies within a wireless communication environment.
Figure 13:
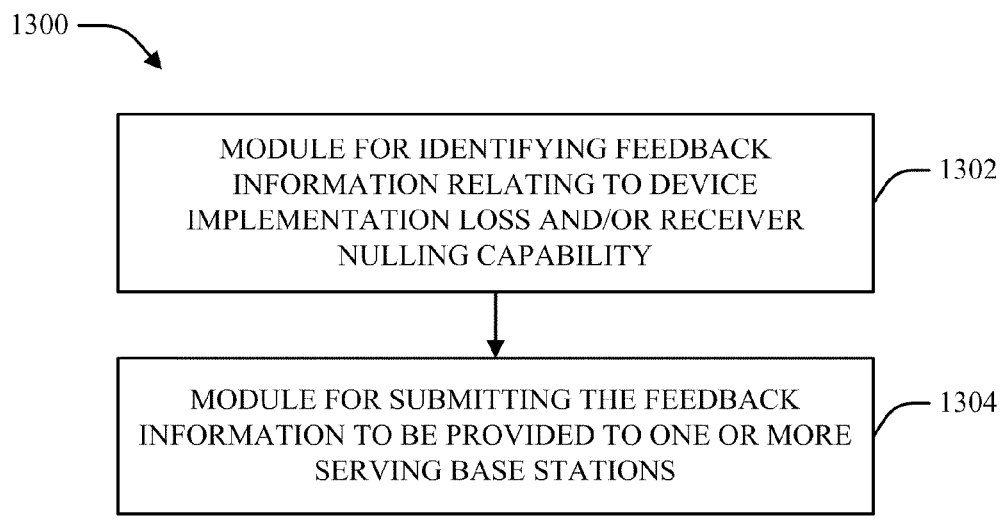

Referring next to FIGS. 12-13, respective apparatuses 1200-1300 that can be utilized in accordance with various aspects described herein are illustrated. It is to be appreciated that apparatuses 1200-1300 are represented as including functional blocks, which can be functional blocks that represent functions implemented by a processor, software, or combination thereof (e.g., firmware).

With reference to FIG. 12, an apparatus 1200 that facilitates initialization and use of respective cooperation strategies within a wireless communication environment is illustrated. Apparatus 1200 can be implemented by a network cell (e.g., cell 110) and/or another suitable network entity and can include a module 1202 for obtaining channel state information from one or more terminals; a module 1204 for estimating carrier and interference levels associated with the one or more terminals based on the channel state information; and a module 1206 for calculating projected rates for the one or more terminals as a function of the carrier and interference levels associated with the one or more terminals.

FIG. 13 illustrates another apparatus 1300 that facilitates initialization and use of respective cooperation strategies within a wireless communication environment. Apparatus 1300 can be implemented by a UE (e.g., UE 120) and/or another suitable network device and can include a module 1302 for identifying feedback information relating to device implementation loss and/or receiver nulling capability and a module 1304 for submitting the feedback information to be provided to one or more serving base stations.

Figure 14:
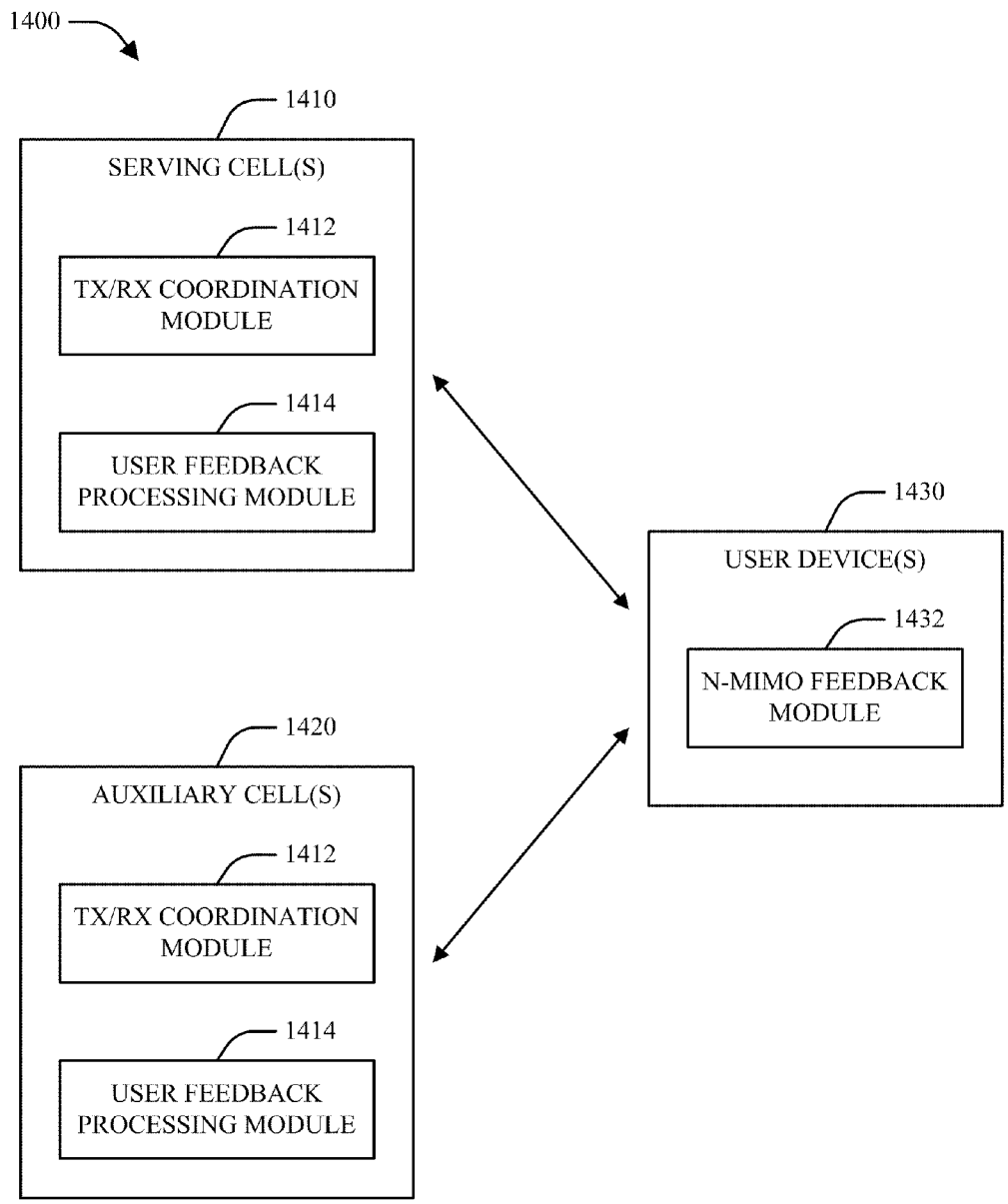
FIG. 14 illustrates an example system that facilitates cooperative multipoint communication in accordance with various aspects described herein.

Referring next to FIG. 14, an example system 1400 that facilitates cooperative multipoint communication in accordance with various aspects described herein is illustrated. As FIG. 14 illustrates, system 1400 can include respective user devices 1430 that can communicate with one or more associated network cells, such as serving cell(s) 1410 and auxiliary cell(s) 1420. While the names "serving cell" and "auxiliary cell" are used to refer to network cells 1410-1420, it should be appreciated that no functionality of cells 1410-1420 is intended to be implied by such naming. For example, an auxiliary cell 1420 can serve a user device 1430 by providing communication coverage for user device 1430 in addition to, or in place of, a serving cell 1410 in some cases. Further, cells 1410-1420 can be any of any suitable cell type(s), including, for example, macro cells, femto cells or Home Node Bs (HNBs), pico cells, relays, or the like.

In accordance with one aspect, respective serving cells 1410 and auxiliary cells 1420 can cooperate to perform N-MIMO or CoMP communication with one or more user devices 1430, thereby improving the overall throughput and performance of system 1400 as compared to a conventional wireless communication system in which a user device connects to a single cell (e.g., a closest and/or strongest cell). In one example, CoMP and/or other techniques can be utilized to facilitate cooperation between respective cells 1410-1420, between respective sectors associated with one or more cells 1410-1420, and/or any other suitable network entities. Such cooperation can be facilitated by, for example, a TX/RX coordination module 1412 associated with respective cells 1410-1420 and/or any other suitable mechanism(s). Further, TX/RX coordination module 1412 can facilitate cooperation between respective network entities according to any suitable network cooperation strategy(ies), such as fractional frequency reuse, silencing, coordinated beamforming, joint transmission, or the like.

In one example, coordinated beamforming can be conducted between network nodes associated with respective cells 1410-1420 by coordinating transmissions from the respective cells 1410-1420 such that if a transmission to a user device 1430 occurs from a given cell 1410 or 1420, a beam is chosen to serve the user device 1430 by the given cell 1410 or 1420 such that the transmission to the user device 1430 is orthogonal or otherwise substantially mismatched to user devices scheduled on neighboring cells 1410 and/or 1420. By doing so, it can be appreciated that beamforming gains can be realized for a desired user device 1430 while simultaneously reducing the effects of interference on neighboring network devices. In one example, coordinated beamforming can be facilitated by performing scheduling, beam selection, user selection (e.g., by selecting user devices 1430 having desirable beams that substantially limit interference at neighboring devices), or the like.

Additionally or alternatively, joint transmission can be conducted between a plurality of network nodes and a given user device 1430 by, for example, pooling resources designated for transmission to a given user device 1430 and transmitting the pooled resources via multiple distinct network nodes (e.g., nodes corresponding to a serving cell 1410 as well as an auxiliary cell 1420). In one example, resource pooling among network nodes corresponding to different cells 1410-1420 can be conducted via a backhaul link between the cells 1410-1420 and/or any other suitable mechanism. In another example, similar techniques can be utilized for uplink joint transmission, wherein a user device 1430 can be configured to transmit data, control signaling, and/or other appropriate information to multiple network nodes. For example, instead of a first cell transmitting a modulation symbol x to a first user and a second cell transmitting a modulation symbol y to a second user, the cells can cooperate such that the first cell transmits ax+by to one or both of the users and the second cell transmits cx+dy to the same user(s), where a, b, c, and d are coefficients chosen to optimize the signal-to-noise ratio (SNR) of the users, system capacity, and/or any other suitable metric(s).

In accordance with one aspect, various aspects of uplink and downlink CoMP communication can be based on feedback provided by respective user devices 1430. For example, a N-MIMO feedback module 1432 at respective user devices 1430 can be utilized to provide feedback to various cells 1410-1420, which in turn can utilize a user feedback processing module 1414 and/or other suitable means to utilize the feedback in conducting cooperative communication within system 1400. By way of example, in the case of downlink CoMP communication, a N-MIMO feedback module 1432 at user device(s) 1430 can facilitate channel reporting to respective cells 1410-1420 of respective serving cells as well as one or more neighboring non-cooperative cells. By way of another example, in the case of uplink CoMP communication, N-MIMO feedback module 1432 can provide feedback information to respective cells 1410-1420 in combination with respectively scheduled uplink transmissions to the cells 1410-1420 that can be utilized by the cells 1410-1420 to facilitate the removal of interference from the corresponding uplink transmissions.

Figure 15:
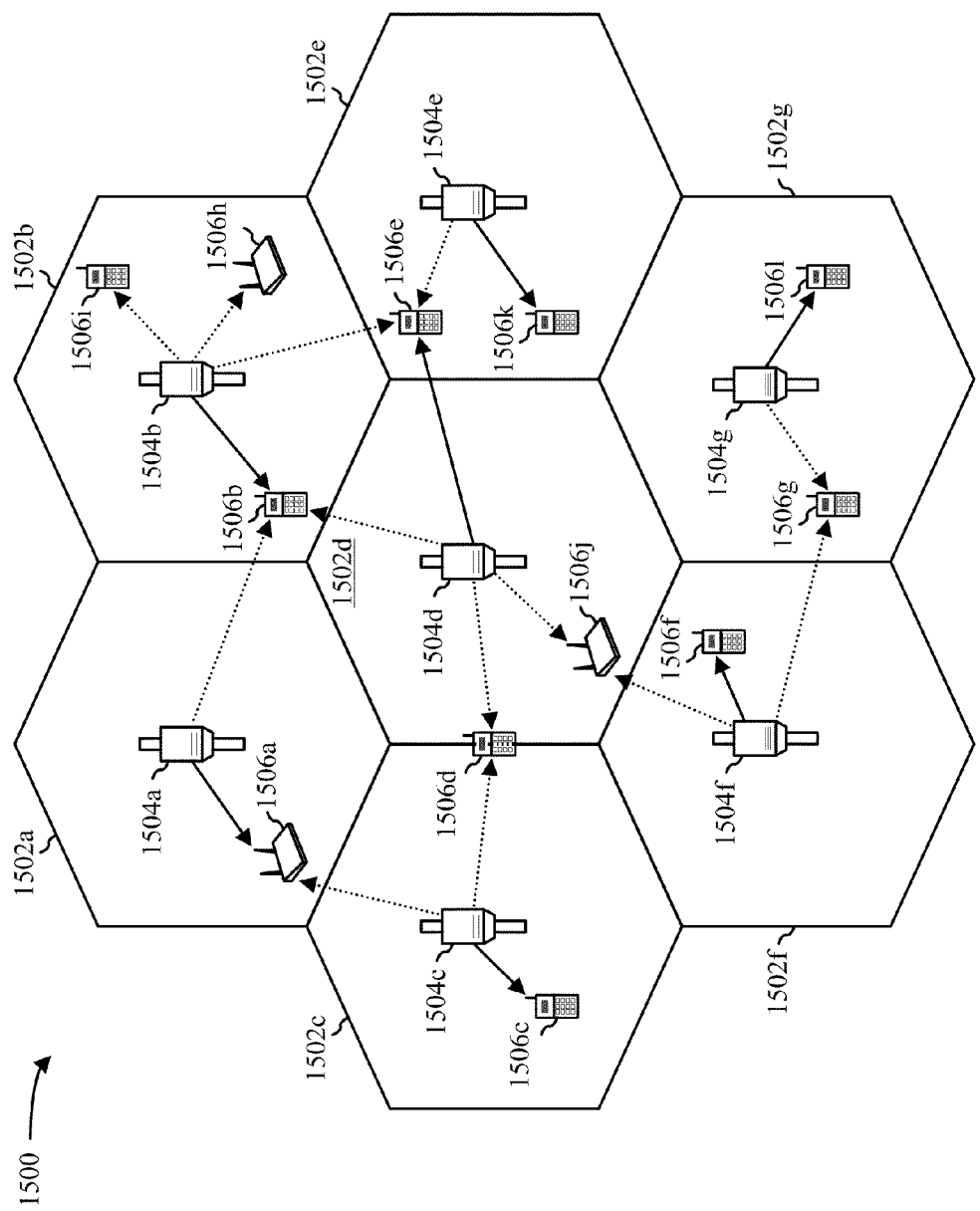
FIG. 15 illustrates an example wireless communication system in accordance with various aspects set forth herein.

Turning to FIG. 15, an exemplary wireless communication system 1500 is illustrated. In one example, system 1500 can be configured to support a number of users, in which various disclosed embodiments and aspects can be implemented. As shown in FIG. 15, by way of example, system 1500 can provide communication for multiple cells 1502, (e.g., macro cells 1502a-1502g), with respective cells being serviced by corresponding access points (AP) 1504 (e.g., APs 1504a-1504g). In one example, one or more cells can be further divided into respective sectors (not shown).

As FIG. 15 further illustrates, various access terminals (ATs) 1506, including ATs 1506a-1506k, can be dispersed throughout system 1500. In one example, an AT 1506 can communicate with one or more APs 1504 on a forward link (FL) and/or a reverse link (RL) at a given moment, depending upon whether the AT is active and whether it is in soft handoff and/or another similar state. As used herein and generally in the art, an AT 1506 can also be referred to as a user equipment (UE), a mobile terminal, and/or any other suitable nomenclature. In accordance with one aspect, system 1500 can provide service over a substantially large geographic region. For example, macro cells 1502a-1502g can provide coverage for a plurality of blocks in a neighborhood and/or another similarly suitable coverage area.

Figure 16:
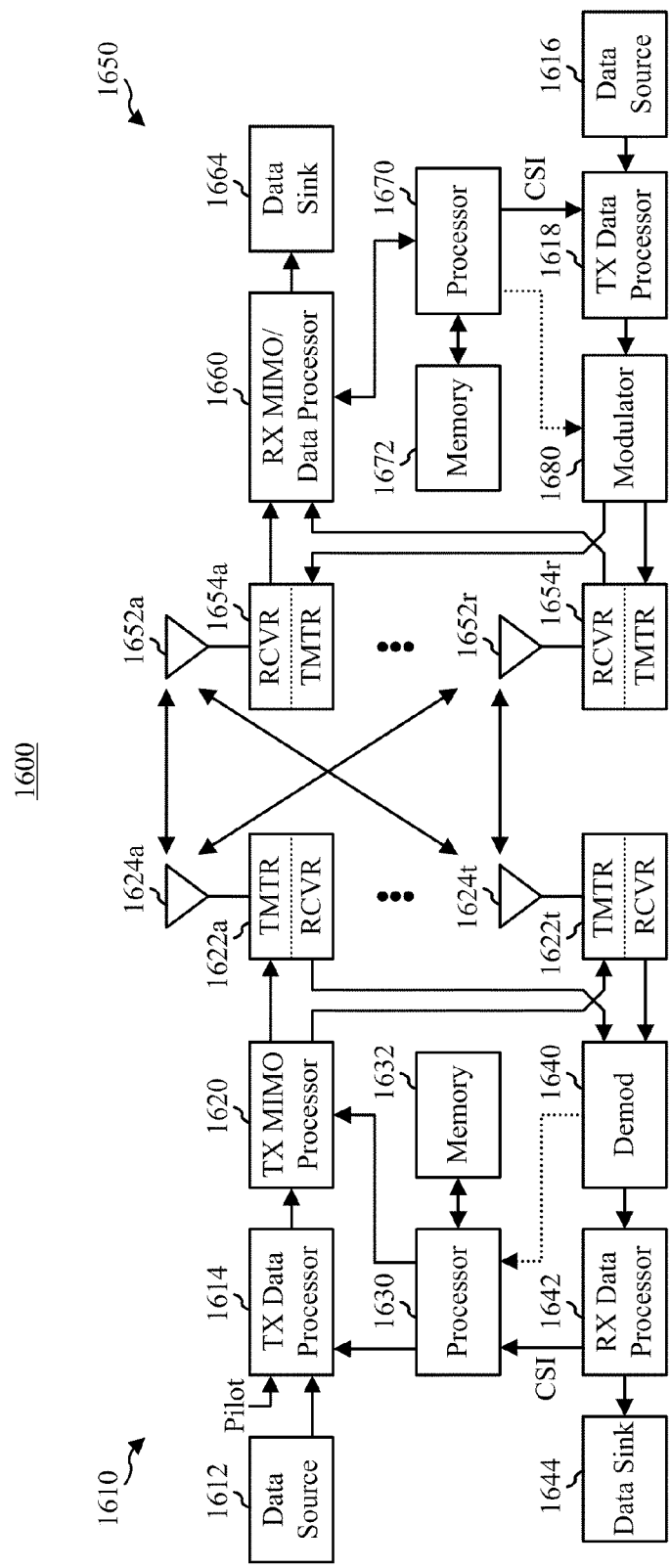
FIG. 16 is a block diagram illustrating an example wireless communication system in which various aspects described herein can function.

Referring now to FIG. 16, a block diagram illustrating an example wireless communication system 1600 in which various aspects described herein can function is provided. In one example, system 1600 is a multiple-input multiple-output (MIMO) system that includes a transmitter system 1610 and a receiver system 1650. It should be appreciated, however, that transmitter system 1610 and/or receiver system 1650 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1610 and/or receiver system 1650 described herein could be utilized in connection with a single output to single input antenna system.

In accordance with one aspect, traffic data for a number of data streams are provided at transmitter system 1610 from a data source 1612 to a transmit (TX) data processor 1614. In one example, each data stream can then be transmitted via a respective transmit antenna 1624. Additionally, TX data processor 1614 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1650 to estimate channel response. Back at transmitter system 1610, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1630.

Next, modulation symbols for all data streams can be provided to a TX processor 1620, which can further process the modulation symbols (e.g., for OFDM). TX MIMO processor 1620 can then provides $N_T$ modulation symbol streams to $N_T$ transceivers 1622a through 1622t. In one example, each transceiver 1622 can receive and process a respective symbol stream to provide one or more analog signals. Each transceiver 1622 can then further condition (e.g., amplify, filter, and upconvert) the analog signals to provide a modulated signal suitable for transmission over a MIMO channel. Accordingly, $N_T$ modulated signals from transceivers 1622a through 1622t can then be transmitted from $N_T$ antennas 1624a through 1624t, respectively.

In accordance with another aspect, the transmitted modulated signals can be received at receiver system 1650 by $N_R$ antennas 1652a through 1652r. The received signal from each antenna 1652 can then be provided to respective transceivers 1654. In one example, each transceiver 1654 can condition (e.g., filter, amplify, and downconvert) a respective received signal, digitize the conditioned signal to provide samples, and then processes the samples to provide a corresponding "received" symbol stream. An RX MIMO/data processor 1660 can then receive and process the $N_R$ received symbol streams from $N_R$ transceivers 1654 based on a particular receiver processing technique to provide $N_T$ "detected" symbol streams. In one example, each detected symbol stream can include symbols that are estimates of the modulation symbols transmitted for the corresponding data stream. RX processor 1660 can then process each symbol stream at least in part by demodulating, deinterleaving, and decoding each detected symbol stream to recover traffic data for a corresponding data stream. Thus, the processing by RX processor 1660 can be complementary to that performed by TX MIMO processor 1620 and TX data processor 1616 at transmitter system 1610. RX processor 1660 can additionally provide processed symbol streams to a data sink 1664.

In accordance with one aspect, the channel response estimate generated by RX processor 1660 can be used to perform space/time processing at the receiver, adjust power levels, change modulation rates or schemes, and/or other appropriate actions. Additionally, RX processor 1660 can further estimate channel characteristics such as, for example, signal-to-noise-and-interference ratios (SNRs) of the detected symbol streams. RX processor 1660 can then provide estimated channel characteristics to a processor 1670. In one example, RX processor 1660 and/or processor 1670 can further derive an estimate of the "operating" SNR for the system. Processor 1670 can then provide channel state information (CSI), which can comprise information regarding the communication link and/or the received data stream. This information can include, for example, the operating SNR. The CSI can then be processed by a TX data processor 1618, modulated by a modulator 1680, conditioned by transceivers 1654*a* through 1654*r*, and transmitted back to transmitter system 1610. In addition, a data source 1616 at receiver system 1650 can provide additional data to be processed by TX data processor 1618.

Back at transmitter system 1610, the modulated signals from receiver system 1650 can then be received by antennas 1624, conditioned by transceivers 1622, demodulated by a demodulator 1640, and processed by a RX data processor 1642 to recover the CSI reported by receiver system 1650. In one example, the reported CSI can then be provided to processor 1630 and used to determine data rates as well as coding and modulation schemes to be used for one or more data streams. The determined coding and modulation schemes can then be provided to transceivers 1622 for quantization and/or use in later transmissions to receiver system 1650. Additionally and/or alternatively, the reported CSI can be used by processor 1630 to generate various controls for TX data processor 1614 and TX MIMO processor 1620. In another example, CSI and/or other information processed by RX data processor 1642 can be provided to a data sink 1644.

In one example, processor 1630 at transmitter system 1610 and processor 1670 at receiver system 1650 direct operation at their respective systems. Additionally, memory 1632 at transmitter system 1610 and memory 1672 at receiver system 1650 can provide storage for program codes and data used by processors 1630 and 1670, respectively. Further, at receiver system 1650, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 17:
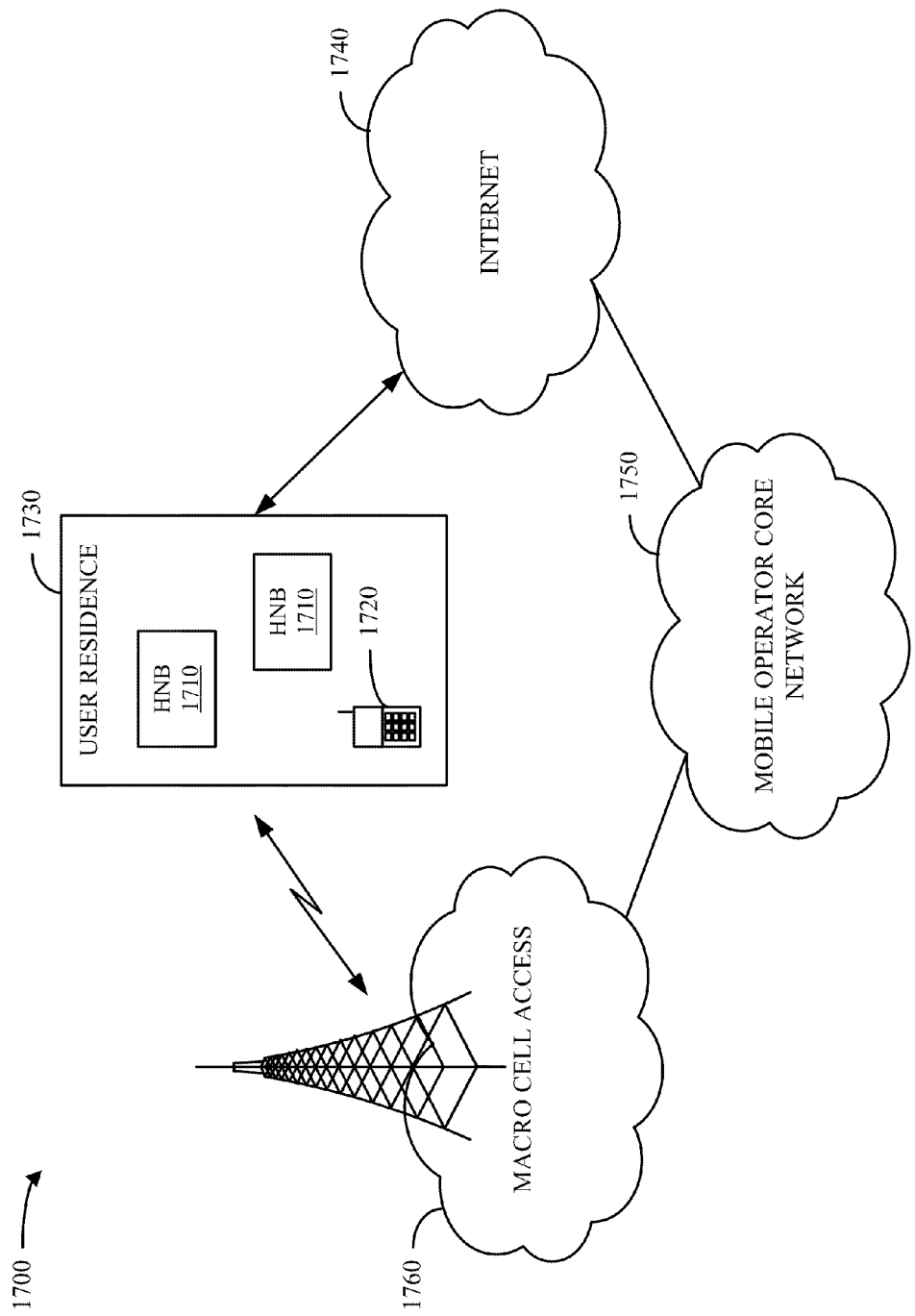
FIG. 17 illustrates an example communication system that enables deployment of access point base stations within a network environment.

FIG. 17 illustrates an example communication system 1700 that enables deployment of access point base stations within a network environment. As shown in FIG. 17, system 1700 can include multiple access point base stations (e.g., femto cells or Home Node B units (HNBs)) such as, for example, HNBs 1710. In one example, respective HNBs 1710 can be installed in a corresponding small scale network environment, such as, for example, one or more user residences 1730. Further, respective HNBs 1710 can be configured to serve associated and/or alien UE(s) 1720. In accordance with one aspect, respective HNBs 1710 can be coupled to the Internet 1740 and a mobile operator core network 1750 via a DSL router, a cable modem, and/or another suitable device (not shown). In accordance with one aspect, an owner of a femto cell or HNB 1710 can subscribe to mobile service, such as, for example, 3G/4G mobile service, offered through mobile operator core network 1750. Accordingly, UE 1720 can be enabled to operate both in a macro cellular environment 1760 and in a residential small scale network environment.

In one example, UE 1720 can be served by a set of Femto cells or HNBs 1710 (e.g., HNBs 1710 that reside within a corresponding user residence 1730) in addition to a macro cell mobile network 1760. As used herein and generally in the art, a home femto cell is a base station on which an AT or UE is authorized to operate on, a guest femto cell refers to a base station on which an AT or UE is temporarily authorized to operate on, and an alien femto cell is a base station on which the AT or UE is not authorized to operate on. In accordance with one aspect, a femto cell or HNB 1710 can be deployed on a single frequency or on multiple frequencies, which may overlap with respective macro cell frequencies.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    identifying a set of network users;
    obtaining information relating to signal qualities identified by respective network users and interference levels observed by the respective network users; and
    computing per-user projected rates for network multiple-in-multiple-out (N-MIMO) communication with the respective network users based at least in part on obtained information relating to the signal qualities and interference levels of the respective network, wherein the computing comprises computing per-user projected rates based on one or more of propagation channels for respective links involved in Coordinated Multipoint (CoMP) communication with the respective network users, channel prediction accuracy determined according to projected downlink channel estimation error or user feedback delay, or anticipated interference levels from respective network nodes within range of the respective network users.

2. A method, comprising:
identifying a set of network users;
obtaining information relating to signal qualities identified by respective network users and interference levels observed by the respective network users;
computing per-user projected rates for network multiple-in-multiple-out (N-MIMO) communication with the respective network users based at least in part on obtained information relating to the signal qualities and interference levels of the respective network user; and
obtaining information relating to processing loss of the respective network users,
wherein the computing comprises computing per-user projected rates based at least in part on the processing loss of the respective network users.

3. The method of claim 2, wherein processing loss of the respective network users is determined according to at least one of channel implementations utilized by the respective network users or soft decoding techniques leveraged by the respective network users.

4. The method of claim 2, wherein the obtaining information relating to processing loss comprises obtaining processing loss feedback from one or more network users.

5. The method of claim 2, wherein the obtaining information relating to processing loss comprises obtaining information relating to a mandated maximum processing loss associated with one or more network users.

6. The method of claim 5, wherein the mandated maximum processing loss is provided via a minimum performance specification (MPS).

7. The method of claim 5, wherein the mandated maximum processing loss varies according to respective user categories to which the one or more network users belong.

8. The method of claim 5, wherein:
the obtaining information relating to processing loss further comprises obtaining processing loss feedback from one or more network users and selecting a processing loss parameter for the respective network users from the mandated maximum processing loss or the processing loss feedback; and
the computing further comprises computing per-user projected rates for one or more network users based at least in part on the selected processing loss.

9. A method, comprising:
identifying a set of network users;
obtaining information relating to signal qualities identified by respective network users and interference levels observed by the respective network users;
computing per-user projected rates for network multiple-in-multiple-out (N-MIMO) communication with the respective network users based at least in part on obtained information relating to the signal qualities and interference levels of the respective network user; and
obtaining information relating to interference nulling capability of the respective network users,
wherein the computing comprises computing per-user projected rates based at least in part on the interference nulling capability of the respective network users.

10. The method of claim 9, wherein the obtaining information relating to interference nulling capability comprises obtaining feedback from one or more network users comprising an indication of interference nulling capability of the one or more network users.

11. The method of claim 9, wherein the obtaining information relating to interference nulling capability comprises obtaining information relating to a minimum interference nulling capability requirement associated with one or more network users.

12. The method of claim 11, wherein minimum interference nulling capability requirements are mandated for respective network users according to user categories to which the respective network users belong.

13. The method of claim 11, further comprising assigning minimum interference nulling capability requirements to respective network users as a number of dominant interferers for which nulling is available in relation to a number of simultaneous multiple-in-multiple-out (MIMO) streams supportable by the respective network users.

14. The method of claim 11, wherein:
the obtaining information relating to interference nulling capability further comprises obtaining indications of interference nulling capability from one or more network users and selecting an interference nulling capability level for one or more network users from the minimum interference nulling capability requirement or the indications of interference nulling capability; and
the computing further comprises computing per-user projected rates for one or more network users based at least in part on the selected interference nulling capability level.

15. A method, comprising:
identifying a set of network users;
obtaining information relating to signal qualities identified by respective network users and interference levels observed by the respective network users;
computing per-user projected rates for network multiple-in-multiple-out (N-MIMO) communication with the respective network users based at least in part on obtained information relating to the signal qualities and interference levels of the respective network user;
computing a marginal utility associated with an identified network user; and
selecting a cooperation strategy to be utilized for CoMP communication with the identified network user based on the computed marginal utility.

16. The method of claim 15, wherein the computing a marginal utility comprises optimizing the marginal utility using one or more of zero forcing or maximum ratio combining.

17. The method of claim 15, wherein the selecting a cooperation strategy comprises selecting one or more of coordinated silencing (CS), joint transmission (JT), or coordinated beamforming (CBF) as a cooperation strategy for CoMP communication with the identified network user.

18. A wireless communications apparatus, comprising:
a memory that stores data relating to a set of user equipment units (UEs); and
a processor configured to identify information relating to signal qualities and interference levels associated with respective UEs and to compute per-UE projected rates for coordinated multipoint (CoMP) communication with the respective UEs based at least in part on identified information relating to the respective UEs, to identify implementation loss levels associated with the respective UEs, and to compute projected rates for the respective UEs based on the implementation loss levels associated therewith.

19. The wireless communications apparatus of claim 18, wherein implementation loss levels associated with the respective UEs are defined in terms of at least one of channel implementations utilized by the respective UEs or soft decoding techniques leveraged by the respective UEs.

20. The wireless communications apparatus of claim 18, wherein the processor is further configured to obtain implementation loss information from feedback provided by the respective UEs.

21. The wireless communications apparatus of claim 18, wherein the processor is further configured to identify an implementation loss limit for the respective UEs.

22. The wireless communications apparatus of claim 21, wherein the processor is further configured to obtain implementation loss feedback from one or more UEs, to select an implementation loss parameter for the respective UEs from the implementation loss limit for the respective UEs and the implementation loss feedback, and to compute projected rates for the respective UEs according to the selected implementation loss parameter.

23. A wireless communications apparatus, comprising:
    a memory that stores data relating to a set of user equipment units (UEs); and
    a processor configured to identify information relating to signal qualities and interference levels associated with respective UEs and to compute per-UE projected rates for coordinated multipoint (CoMP) communication with the respective UEs based at least in part on identified information relating to the respective UEs, to identify receiver nulling capability levels associated with the respective UEs, and to compute projected rates for the respective UEs based on the receiver nulling capability levels associated therewith.

24. The wireless communications apparatus of claim 23, wherein the processor is further configured to obtain receiver nulling capability levels for respective UEs from feedback provided by the respective UEs.

25. The wireless communications apparatus of claim 23, wherein the processor is further configured to identify a predetermined minimum receiver nulling capability level for the respective UEs.

26. The wireless communications apparatus of claim 25, wherein the processor is further configured to obtain receiver nulling capability level feedback from the respective UEs, to select a receiver nulling capability level for the respective UEs from the predetermined minimum receiver nulling capability level and the receiver nulling capability level feedback, and to compute projected rates for the respective UEs according to the selected receiver nulling capability level.

27. A wireless communications apparatus, comprising:
    a memory that stores data relating to a set of user equipment units (UEs); and
    a processor configured to identify information relating to signal qualities and interference levels associated with respective UEs, to compute per-UE projected rates for coordinated multipoint (CoMP) communication with the respective UEs based at least in part on identified information relating to the respective UEs, to calculate a marginal utility associated with an identified UE, and to select a CoMP communication strategy to be utilized for the identified UE based on the calculated marginal utility.

28. The wireless communications apparatus of claim 27, wherein the processor is further configured to select a CoMP communication strategy from the group consisting of coordinated silencing (CS), joint transmission (JT), and coordinated beamforming (CBF).

29. An apparatus, comprising:
    means for obtaining channel state information from one or more terminals;
    means for estimating carrier and interference levels associated with the one or more terminals based on the channel state information;
    means for calculating projected rates for the one or more terminals as a function of estimated carrier and interference levels associated with the one or more terminals;
    means for identifying processing loss of respective terminals,
    wherein the means for calculating comprises means for calculating projected rates for respective terminals based at least in part on the processing loss of the respective terminals.

30. The apparatus of claim 29, wherein the means for identifying comprises means for receiving processing loss feedback from one or more terminals.

31. The apparatus of claim 29, wherein the means for identifying comprises means for identifying a mandated processing loss limit for the one or more terminals.

32. The apparatus of claim 31, wherein:
    the means for identifying further comprises means for receiving processing loss feedback from one or more terminals and means for selecting a processing loss parameter for the one or more terminals from the mandated processing loss limit or the processing loss feedback; and
    the means for calculating further comprises means for calculating projected rates for the one or more terminals according to a selected processing loss.

33. An apparatus, comprising:
    means for obtaining channel state information from one or more terminals;
    means for estimating carrier and interference levels associated with the one or more terminals based on the channel state information;
    means for calculating projected rates for the one or more terminals as a function of estimated carrier and interference levels associated with the one or more terminals;
    means for identifying interference nulling capability of respective terminals,
    wherein the means for calculating comprises means for calculating projected rates for respective terminals based at least in part on the interference nulling capability of the respective terminals.

34. The apparatus of claim 33, wherein the means for identifying comprises means for receiving interference nulling capability indication feedback from one or more terminals.

35. The apparatus of claim 33, wherein the means for identifying comprises means for identifying a minimum interference nulling capability requirement for the one or more terminals.

36. The apparatus of claim 35, wherein:
    the means for identifying further comprises receiving interference nulling capability indication feedback from one or more terminals and means for selecting an interference nulling capability level for the one or more terminals from the minimum interference nulling capability requirement or the interference nulling capability indication feedback; and the means for calculating further comprises means for calculating projected rates for the one or more terminals according to a selected interference nulling capability level.

37. A computer program product, comprising:
a non-transitory computer-readable medium, comprising:
code for causing a computer to obtain channel state information from one or more user equipment units (UEs);
code for causing a computer to estimate carrier and interference levels associated with the one or more UEs based on the channel state information; and
code for causing a computer to calculate projected rates for the one or more UEs as a function of estimated carrier and interference levels associated with the one or more UEs; and
code for causing a computer to identify processing loss of respective UEs; and
wherein the code for causing a computer to calculate comprises code for causing a computer to calculate projected rates for respective UEs based at least in part on the processing loss of the respective UEs.

38. The computer program product of claim 37, wherein the code for causing a computer to identify processing loss comprises at least one of code for causing a computer to receive processing loss feedback from one or more UEs or code for causing a computer to identify a mandated processing loss limit for the one or more UEs.

39. A computer program product, comprising:
a non-transitory computer-readable medium, comprising:
code for causing a computer to obtain channel state information from one or more user equipment units (UEs);
code for causing a computer to estimate carrier and interference levels associated with the one or more UEs based on the channel state information;
code for causing a computer to calculate projected rates for the one or more UEs as a function of estimated carrier and interference levels associated with the one or more UEs; and
code for causing a computer to identify interference nulling capability of respective UEs; and
wherein the code for causing a computer to calculate comprises code for causing a computer to calculate projected rates for respective UEs based at least in part on the interference nulling capability of the respective UEs.

40. The computer program product of claim 39, wherein the code for causing a computer to identify interference nulling capability comprises at least one of code for causing a computer to receive interference nulling capability indication feedback from one or more UEs or code for causing a computer to identify a minimum interference nulling capability requirement for the one or more UEs.

* * * * *